US011834588B2

(12) United States Patent
Richer et al.

(10) Patent No.: US 11,834,588 B2
(45) Date of Patent: Dec. 5, 2023

(54) ACTIVATABLE POLYMER COMPOSITION COMPRISING AT LEAST TWO CARBOXYLIC ACIDS AS BLOWING AGENT

(71) Applicant: Zephyros, Inc., Romeo, MI (US)

(72) Inventors: Lucile Richer, Molsheim (FR); Thomas Devanne, Molsheim (FR); Roland Rahme, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 829 days.

(21) Appl. No.: 16/484,996

(22) PCT Filed: Feb. 13, 2018

(86) PCT No.: PCT/EP2018/053560
§ 371 (c)(1),
(2) Date: Aug. 9, 2019

(87) PCT Pub. No.: WO2018/149826
PCT Pub. Date: Aug. 23, 2018

(65) Prior Publication Data
US 2019/0382629 A1 Dec. 19, 2019

(30) Foreign Application Priority Data
Feb. 17, 2017 (EP) .................................. 17156690

(51) Int. Cl.
C09J 123/08 (2006.01)
C09J 11/06 (2006.01)
C09J 11/08 (2006.01)
C09J 11/04 (2006.01)
C09J 129/14 (2006.01)
C08J 9/14 (2006.01)
C08J 9/08 (2006.01)
C08K 5/092 (2006.01)
C08K 5/09 (2006.01)
C08J 9/00 (2006.01)

(52) U.S. Cl.
CPC ........... C09J 123/0853 (2013.01); C08J 9/08 (2013.01); C08J 9/142 (2013.01); C08K 5/09 (2013.01); C08K 5/092 (2013.01); C09J 11/04 (2013.01); C09J 11/06 (2013.01); C09J 11/08 (2013.01); C09J 129/14 (2013.01); C08J 9/0061 (2013.01); C08J 2203/02 (2013.01); C08J 2203/18 (2013.01); C08J 2203/20 (2013.01); C08J 2207/02 (2013.01); C08J 2323/08 (2013.01); C08J 2331/04 (2013.01); C08J 2333/06 (2013.01); C08J 2333/08 (2013.01); C08J 2333/10 (2013.01); C08J 2333/12 (2013.01); C08J 2333/14 (2013.01); C08J 2423/08 (2013.01); C08J 2431/04 (2013.01); C08J 2433/06 (2013.01); C08J 2433/08 (2013.01); C08J 2433/10 (2013.01); C08J 2433/12 (2013.01); C08J 2433/14 (2013.01); C09J 2400/24 (2013.01)

(58) Field of Classification Search
CPC ........ C09J 123/085; C09J 11/04; C09J 11/06; C09J 11/08; C09J 129/14; C09J 2400/24; C08J 9/08; C08J 9/142; C08J 9/0061; C08J 2203/02; C08J 2203/18; C08J 2203/20; C08J 2207/02; C08J 2323/08; C08J 2331/04; C08J 2333/06; C08J 2333/08; C08J 2333/10; C08J 2333/12; C08J 2333/14; C08J 2423/08; C08J 2431/04; C08J 2433/06; C08J 2433/08; C08J 2433/10; C08J 2433/12; C08J 2433/14; C08J 2201/26; C08K 5/09; C08K 5/092
See application file for complete search history.

(56) References Cited

U.S. PATENT DOCUMENTS 4,330,635 A * 5/1982 Tokas .................. C08J 9/08
521/97
5,407,966 A * 4/1995 Ebert .................. C08J 9/08
521/97
2015/0376361 A1 12/2015 Scholz

FOREIGN PATENT DOCUMENTS

| CN | 106133039 A | 11/2016 |
|---|---|---|
| EP | 0523398 A1 | 1/1993 |
| FR | 2154633 A1 | 5/1973 |
| GB | 994073 A | 6/1965 |

(Continued)

OTHER PUBLICATIONS

Chinese Office Action dated Aug. 31, 2021, Application No. 201880012471.0.

(Continued)

Primary Examiner — Irina S Zemel
(74) Attorney, Agent, or Firm — The Dobrusin Law Firm, PC

(57) ABSTRACT

The invention relates to a curable volume expandable polymer composition comprising an organic acid component, wherein the organic acid component comprises a first organic acid, a second organic acid, and optionally one or more additional organic acids; wherein said polymer composition, when being heated to an activation of expansion temperature above room temperature, undergoes volume expansion. When the organic acid component is heated to the activation of expansion temperature, the first organic acid and/or the second organic acid and/or the optionally present one or more additional organic acids decarboxylate and thus release carbon dioxide. The polymer composition traps the thus released carbon dioxide thereby causing the polymer composition to undergo volume expansion.

20 Claims, 2 Drawing Sheets

(56) References Cited

FOREIGN PATENT DOCUMENTS

| | | |
|---|---|---|
| JP | H0665698 B2 | 3/1989 |
| JP | H08113625 A | 5/1996 |
| JP | 2001011255 A | 1/2001 |
| JP | 2003306565 A | 10/2003 |
| JP | 2003321565 A | 11/2003 |
| JP | 2003327732 A | 11/2003 |
| JP | 2007238958 A | 9/2007 |
| JP | 2008013780 A | 1/2008 |
| WO | 2008127544 A2 | 10/2008 |

OTHER PUBLICATIONS

International Search Report dated Oct. 4, 2018, Application No. PCT/EP2018/053560.
India Examination Report dated Jan. 29, 2021, Application No. IN201927032957.
European Communication dated Jun. 9, 2020, Application No. 18706455.5.
PCT International Preliminary Report on Patentability dated Sep. 4, 2019.

\* cited by examiner

ACTIVATABLE POLYMER COMPOSITION COMPRISING AT LEAST TWO CARBOXYLIC ACIDS AS BLOWING AGENT

The invention relates to a curable volume expandable polymer composition comprising an organic acid component, wherein the organic acid component comprises a first organic acid, a second organic acid, and optionally one or more additional organic acids; wherein said polymer composition, when being heated to an activation of expansion temperature above room temperature, undergoes volume expansion. When the organic acid component is heated to the activation of expansion temperature, the first organic acid and/or the second organic acid and/or the optionally present one or more additional organic acids decarboxylate and thus release carbon dioxide. The polymer composition traps the thus released carbon dioxide thereby causing the polymer composition to undergo volume expansion.

Thermally expandable polymer compositions comprising blowing agents which decompose in a controlled fashion accompanied by gas release under defined high temperature conditions are useful tools for many applications. Upon thermal activation of the blowing agent, such expandable polymer compositions form foam-like cellular structures incorporating gas bubbles in the polymer matrix and they expand volumetrically by normally several hundred percent, thus efficiently filling cavities or hollow parts in objects of manufacturing, such as automotive, aerospace or building applications with any source of heat. Often they serve the purpose of reinforcing the hollow structures or cavities without adding excessive weight, or they act as insulation material able to dampen for example noise and vibrations or as thermal insulation. Polymers may be thermoplastic polymers, thermoset polymers or mixtures thereof. Blowing agents may be chemical blowing agents, physical blowing agents or mixtures thereof.

For thermally expandable thermoplastic or thermoset compositions used in automotive manufacturing, i.e. for baffle and reinforcement elements in hollow car body structures, the nowadays most important chemical blowing agent is azodicarbonamide (ADCA), also called azo(bis)formamide. It has a broad decomposition temperature range adjustable between about 140° C. and 200° C. and exhibits a high decomposition gas volume of approximately 200 mL/g. Furthermore, it has a very attractive price/performance ratio. However, recently raised concerns by European legislators regarding potentially adverse health effects for this class of compounds may lead to restrictions or even a ban of their use in expandable thermoplastic or thermoset compositions, which increases demand for viable alternatives. Some alternative chemical blowing agents are already available, such as sodium bicarbonate, oxybis(benzenesulfonyl hydrazide) (OBSH), toluenesulfonyl hydrazide (TSH), p-toluenesulfonyl semicarbazide (TSSC), 5-phenyl tetrazole (5-PT), or N—N'-dinitrosopentamethylene tetramine (DNPT).

These compounds however are only useful in limited applications, as they suffer from either poor decomposition gas volume, release toxic/reactive gases (such as formaldehyde), or require activation of expansion temperatures difficult to meet for baffle or reinforcement elements in automotive manufacturing. Furthermore, it has been additionally observed that upon decomposition of conventional chemical blowing agents, smelly substances are released as byproducts causing unpleasant odours.

FR 2 154 633 relates to a blowing agent for the production of foamed thermoplastic polymers which consist of 0.1-10 wt. % based on polymer, of a neutral metal salt of formic and/or oxalic acid. The blowing agent is preferably Zn formate or Mg oxalate. Blowing agents comprising free carboxylic acid functional groups or specific combinations of at least two different organic acids are not disclosed.

US 2015/376361 relates to composition for the preparation of a polymeric foam with improved thermal properties, to a polymeric foam obtainable therefrom, and to a method for preparing such a polymeric foam each for them comprising (i) an at least essentially amorphous polymer resin and (ii) a nucleating agent. Blowing agents comprising a combination of at least two different organic acids, which upon heating release carbon dioxide due to decarboxylation, are not disclosed.

JPH 0665698 relates to a combination of inorganic carbon dioxide generator and weak acid which is used as the foaming agent. The foaming agent is a combination of sodium bicarbonate and citric acid. The sodium bicarbonate acts as carbon dioxide generating agent. Blowing agents comprising a combination of at least two different organic acids, which upon heating release carbon dioxide due to decarboxylation, are not disclosed.

JPH 08113625 relates to an aromatic polyisocyanate (A), a high-molecular-weight isocyanato-reactive compound (B) having an OH value of 24-55 mg KOH/g, an ethylene oxide content of 10-25 wt. % and a terminal OH value rate of 70-95 mol %, a blowing agent (C) comprising 10 wt. % or below, based on component B, boric acid and/or its ester, or a mixture thereof with an organic carboxylic acid and/or its ester, a catalyst and optionally a crosslinking agent, a foam stabilizer and other adjuvants, which are mixed with each other, and the obtained mixture is poured into a mold and left standing to obtain a molding of a density of 0.3-0.8 $g/cm^3$. The blowing agent is a mixture of boric acid and/or its esters, and an organic carboxylic acid and/or an ester thereof. Blowing agents comprising a combination of at least two different organic acids, which upon heating release carbon dioxide due to decarboxylation, are not disclosed.

JP 2001 011225 discloses that a mixture obtained by melt-mixing 30-80 wt. % styrene/vinylisoprene triblock copolymer with 70-20 wt. % styrene resin in the screw cylinder of an extruder is foamed by extrusion into air through a die attached to the front end of the cylinder while a volatile blowing agent having a boiling point lower than the melting points of the resins or a gaseous blowing agent is injected into the mixture to obtain a synthetic resin foam having a density of 0.6-0.035 $g/cm^3$. Blowing agents comprising a combination of at least two different organic acids, which upon heating release carbon dioxide due to decarboxylation, are not disclosed.

JP 2003 306565 discloses a polypropylene resin foamed sheet having a density: 0.091-0.45 $g/cm^3$, a thickness: 0.5-10 mm, a cell number: 16-100 in the direction of thickness; and a modified polypropylene resin having a closed cell rate: ≥50%, a polypropylene resin melt tension: ≥2.5 at 230° C. Blowing agents comprising a combination of at least two different organic acids, which upon heating release carbon dioxide due to decarboxylation, are not disclosed.

JP 2003 321565 relates to a polypropylene resin foam sheet. The polypropylene-based resin foam sheet has a density of 0.091 to 0.45 $g/cm^3$, a thickness is 0.5 to 10 mm, and a number of cells in the thickness direction of 16 to 100. Blowing agents comprising a combination of at least two different organic acids, which upon heating release carbon dioxide due to decarboxylation, are not disclosed.

JP 2003 327732 relates to a polypropylene resin having a strain hardening rate ηe/(3η) (where ηe represents the elongational viscosity and η represents the shear viscosity) at a strain rate at 100 sec$^{-1}$ of 1.5 or more. Blowing agents comprising a combination of at least two different organic acids, which upon heating release carbon dioxide due to decarboxylation, are not disclosed.

JP 2007 238958 relates to a method for producing a urethane-based thermoplastic elastomer composition foam comprising the steps of: adding and mixing 0.1 to 30 parts by weight of carbon dioxide (B) to 100 parts by weight of a urethane-based thermoplastic elastomer composition (A) in a molten state, in which the urethane-based thermoplastic elastomer composition comprises a urethane-based thermoplastic elastomer (A-1) and other thermoplastic elastomer (A-2) in an (A-1)/(A-2) ratio of 20/80 to 99/1 by weight, to form a molten urethane-based thermoplastic elastomer composition (C); and lowering a temperature of the molten urethane-based thermoplastic elastomer composition (C). Blowing agents comprising a combination of at least two different organic acids, which upon heating release carbon dioxide due to decarboxylation, are not disclosed.

JP 2008 013780 relates to a thermoplastic elastomer composition comprising a thermoplastic elastomer which includes an ethylene-[alpha]-olefin copolymer and a crystalline polyethylene resin, wherein the crystalline polyethylene resin constitutes a three-dimensional network structure in a matrix formed by the ethylene-[alpha]-olefin copolymer, a blowing agent and a nucleating agent, wherein the thermoplastic elastomer has a melt flow rate of ≥5 g/10 min at a temperature of 230° C. and a load of 10 kg, and a melt tension of ≥3.0 gf at a temperature of 210° C. and a taking-off rate of 2 m/min. Blowing agents comprising a combination of at least two different organic acids, which upon heating release carbon dioxide due to decarboxylation, are not disclosed.

WO 2008/127544 relates to foamed film compositions using chemical blowing agents and produced by continuous blown film extrusion or cast film extrusion of polymer foams. The composition has small cell size and is suitable for the production of thin film articles. The articles may be monolayer or multilayered structures. Blowing agents comprising a combination of at least two different organic acids, which upon heating release carbon dioxide due to decarboxylation, are not disclosed.

WO 2015/140282 relates to a thermally expandable composition containing an endothermic, chemical blowing agent, to shaped bodies containing said composition and to a method for sealing and filling hollow sections in components, for strengthening or reinforcing components, in particular hollow components, and for bonding mobile components using shaped bodies of this type. Blowing agents comprising a combination of at least two different organic acids, which upon heating release carbon dioxide due to decarboxylation, are not disclosed.

WO 2016/097365 relates to a chemical blowing agent comprising at least one tertiary alkyl carbamate. The chemical blowing agent can be activated thermally and is suitable for foaming thermoplastic materials and can for example be incorporated into thermally expandable baffle and/or reinforcement elements which are used in automotive manufacturing and building insulation. Blowing agents comprising a combination of at least two different organic acids, which upon heating release carbon dioxide due to decarboxylation, are not disclosed.

There is still an unmet demand for an alternative chemical blowing agent which is commercially viable and shows at least comparable performance as ADCA and which can be easily incorporated in thermally expandable thermoplastic or thermoset compositions that are useful, for example, for baffle or reinforcement elements in automotive manufacturing or building insulation.

It is an object of the invention to provide volume expandable polymer compositions having advantages compared to the polymer compositions of the prior art.

This object has been achieved by the subject-matter of the patent claims.

Detailed Description

Figure 1:
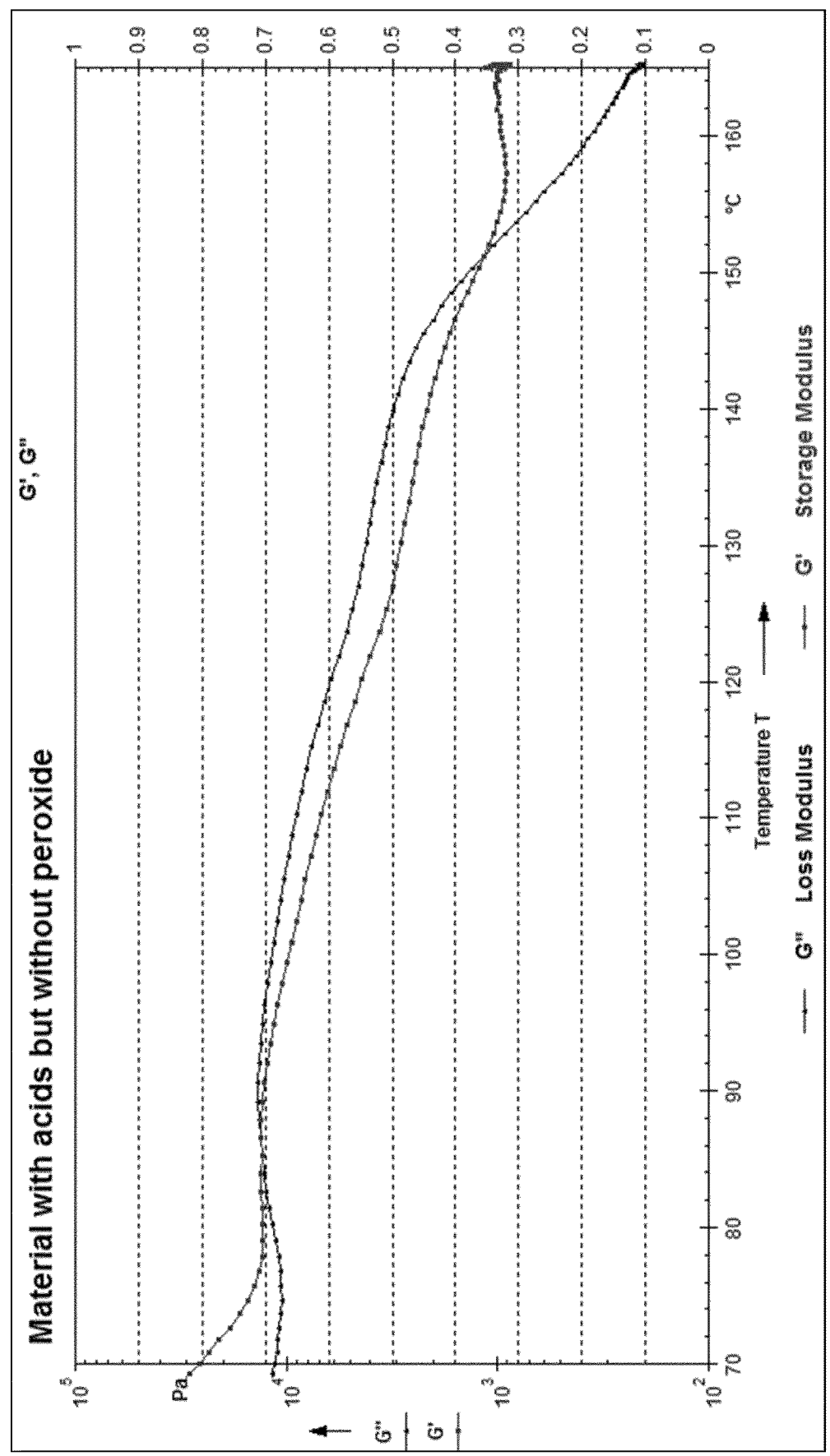
FIG. 1 is a graph showing storage modulus and loss modulus in relation to temperature for materials of the present teachings without peroxide.

It has been surprisingly found that at elevated temperature (activation of expansion temperature) combinations of organic acids provide a synergistic generation of gas, preferably carbon dioxide released due to decarboxylation, that is capable of expanding the volume of the polymer composition. The volume expansion achieved by the inventive combination of organic acids is typically greater than the volume expansion that would be expected in view of the sum of the volume expansions that are observed with the separate organic acids.

Further, it has been found that at elevated temperature (activation of cure temperature) multifunctional organic acids are capable of curing the polymer composition, i.e. act as curing agents, provided that the polymer composition comprises a curable polymer with reactive functional groups such as glycidyl groups that are capable of reacting with the multifunctional organic acids. It has been surprisingly found that satisfactory degrees of curing can already be achieved with curable polymers having a comparatively low content of such reactive functional groups.

Still further, it has been found that when combinations of organic acids provide a synergistic generation of gas, no smelly substances are released as byproducts such that unpleasant odours can be avoided.

A first aspect of the invention relates to a curable volume expandable polymer composition comprising an organic acid component, wherein the organic acid component comprises a first organic acid, a second organic acid, and optionally one or more additional organic acids; wherein said polymer composition, when being heated to an activation of expansion temperature above room temperature, undergoes volume expansion due to decarboxylation of the first organic acid and/or the second organic acid and/or the optionally present one or more additional organic acids. When the organic acid component is heated to the activation of expansion temperature, carbon dioxide is released due to the decarboxylation of the first organic acid and/or the second organic acid and/or the optionally present one or more additional organic acids, and the thus released carbon dioxide is trapped by the polymer composition such that the polymer composition undergoes volume expansion.

For the purpose of the specification, A "and/or" B refers to any one of the following possibilities: "A and B", "A but not B", "B but not A".

The polymer composition according to the invention is a volume expandable polymer composition. When the polymer composition is heated to an activation of expansion temperature above room temperature, it undergoes volume expansion, as the first organic acid and/or the second organic acid and/or the optionally present one or more additional organic acids decarboxylate and thus release a gas comprising carbon dioxide. While the released gas may comprise gases other than carbon dioxide, e.g. nitrogen, carbon monoxide, water, acetic acid, and the like, preferably the gas essentially consists of carbon dioxide.

The polymer composition according to the invention is a curable, preferably heat curable polymer composition, i.e. a volume expandable and curable polymer composition. Preferably, when the curable polymer composition is heated to an activation of cure temperature, which may be identical with or differ from the activation of expansion temperature, it does not only undergo volume expansion, but additionally undergoes curing (cross-linking). In a preferred embodiment, curing is achieved by a reaction (cross-linking) involving the carboxylic acid component. Preferably, curing is heat activated, i.e. preferably the polymer composition already contains all constituents that are necessary for autonomous curing upon heating, i.e. external inductors other than heat, e.g. actinic radiation, are not necessary.

The composition according to the invention is a polymer composition, i.e. the composition comprises at least one polymer, preferably a polymer blend. The polymer composition according to the invention is curable and thus comprises at least one curable polymer (cross-linkable polymer). Curing of polymers may proceed via various different mechanisms which may also take place simultaneously, e.g. as a free radical reaction, as a sulfur vulcanization, as a polycondensation reaction, as a polyaddition reaction, or via any other mechanism that is suitable for curing.

The polymer composition according to the invention comprises an organic acid component which comprises or essentially consists of a first organic acid, a second organic acid, and optionally one or more additional organic acids. For the purpose of the specification, the organic acid component exclusively consists of organic acids. Thus, in case that the polymer composition according to the invention comprises e.g. inorganic acids, those are not be regarded as constituents of the organic acid component.

In a preferred embodiments, the organic acid component comprises two, three, four, five or six organic acids, wherein preferably at least one of said two, three, four, five or six organic acids independently of one another has a molecular weight of at most about 500 g/mol, preferably at most about 300 g/mol.

In a preferred embodiment, the organic acid component consists of two organic acids, namely the first organic acid and the second organic acid, which form a binary acid component.

In a preferred embodiment of the binary acid component, the first organic acid and the second organic acid independently of one another has a molecular weight of more than about 500 g/mol.

In other preferred embodiments of the binary acid component, the first organic acid and/or the second organic acid independently of one another has a molecular weight of at most about 500 g/mol, preferably at most about 300 g/mol.

In a preferred embodiment of the binary acid component, the first organic acid has a molecular weight of at most about 500 g/mol, preferably at most about 300 g/mol, and the second organic acid has a molecular weight of more than about 500 g/mol. In another preferred embodiment of the binary acid component, the second organic acid has a molecular weight of at most about 300 g/mol, and the first organic acid has a molecular weight of more than about 500 g/mol.

In still another preferred embodiment of the binary acid component, which is particularly preferred, the first organic acid as well as the second organic acid both independently of one another have a molecular weight of at most about 500 g/mol, preferably at most about 300 g/mol.

According to the above embodiments of the binary acid component, the polymer composition according to the invention preferably does not comprise any other organic acid having a molecular weight of at most about 500 g/mol, preferably at most about 300 g/mol, besides the first organic acid and the second organic acid.

In another preferred embodiment, the organic acid component consists of three organic acids, namely the first organic acid, the second organic acid and one additional organic acid, which form a ternary acid component.

In a preferred embodiment of the ternary acid component, the first organic acid, the second organic acid, and the one additional organic acid independently of one another has a molecular weight of more than about 500 g/mol.

In other preferred embodiments of the ternary acid component, the first organic acid and/or the second organic acid and/or the one additional organic acid independently of one another has a molecular weight of at most about 500 g/mol, preferably at most about 300 g/mol.

In a preferred embodiment of the ternary acid component, the first organic acid has a molecular weight of at most about 500 g/mol, preferably at most about 300 g/mol, and the second organic acid as well as the one additional organic acid independently of one another both have a molecular weight of more than about 500 g/mol. In another preferred embodiment of the ternary acid component, the second organic acid has a molecular weight of at most about 500 g/mol, preferably at most about 300 g/mol, and the first organic acid as well as the one additional organic acid independently of one another both have a molecular weight of more than about 500 g/mol. In still another preferred embodiment of the ternary acid component, the one additional organic acid has a molecular weight of at most about 500 g/mol, preferably at most about 300 g/mol, and the first organic acid as well as the second organic acid independently of one another both have a molecular weight of more than about 500 g/mol.

In yet another preferred embodiment of the ternary acid component, the first organic acid and the second organic acid independently of one another both have a molecular weight of at most about 500 g/mol, preferably at most about 300 g/mol, and the one additional organic acid has a molecular weight of more than about 500 g/mol. In another preferred embodiment of the ternary acid component, the first organic acid and the one additional organic acid independently of one another both have a molecular weight of at most about 500 g/mol, preferably at most about 300 g/mol, and the second organic acid has a molecular weight of more than about 500 g/mol. In still another preferred embodiment of the ternary acid component, the second organic acid and the one additional organic acid independently of one another both have a molecular weight of at most about 500 g/mol, preferably at most about 300 g/mol, and the one first organic acid has a molecular weight of more than about 500 g/mol.

In yet another preferred embodiment of the ternary acid component, which is particularly preferred, the first organic acid and the second organic acid and the one additional organic acid independently of one another all three have a molecular weight of at most about 500 g/mol, preferably at most about 300 g/mol.

According to the above embodiments of the ternary acid component, the polymer composition according to the invention preferably does not comprise any other organic acid having a molecular weight of at most about 500 g/mol, preferably at most about 300 g/mol, besides the first organic acid, the second organic acid, and the additional organic acid.

In another preferred embodiment, the organic acid component consists of four organic acids, namely the first organic acid, the second organic acid, one additional organic acid and another additional organic acid, wherein preferably the first organic acid and/or the second organic acid and/or the one additional organic acid and/or the another additional organic acid independently of one another has a molecular weight of at most about 500 g/mol, preferably at most about 300 g/mol. According to this embodiment, the polymer composition according to the invention preferably does not comprise any other organic acid having a molecular weight of at most about 500 g/mol, preferably at most about 300 g/mol, besides the first organic acid, the second organic acid, the additional organic acid and the another additional organic acid.

The first organic acid, the second organic acid and the optionally present one or more additional organic acids preferably independently of one another have a molecular weight of at most about 500 g/mol, preferably at most about 300 g/mol, i.e. can be regarded as low molecular weight organic acids. Accordingly, organic acids that are incorporated into a polymer backbone, such as acrylic acid within polyacrylic acid, due to the higher molecular weight of the polymer, are preferably not to be regarded as first organic acid, second organic acid and optionally present one or more additional organic acids according to the invention.

Nonetheless, it is also possible that the first organic acid, the second organic acid and the optionally present one or more additional organic acids preferably independently of one another have a molecular weight of more than about 500 g/mol. For example, the first organic acid can be polyacrylic acid, polymethacrylic acid, a copolymer of acrylic acid, and/or a copolymer of methacrylic acid; and/or the second organic acid can be polyacrylic acid, polymethacrylic acid, a copolymer of acrylic acid, and/or a copolymer of methacrylic acid; and/or the optionally present one or more additional organic acids can be polyacrylic acid, polymethacrylic acid, a copolymer of acrylic acid, and/or a copolymer of methacrylic acid.

For the purpose of the specification, unless expressly stated otherwise, the terms "first organic acid", "second organic acid" and "additional organic acid" independently of one another refer to and include both, free acids with protonated acidic functional groups as well as deprotonated acidic functional groups (salts), e.g. carboxylate salts. Thus, the first organic acid, the second organic acid and the optionally present one or more additional organic acids may be present as free acids (e.g. protonated carboxylic acids, $-CO_2H$), as salts (e.g. deprotonated carboxylates, $-CO_2^-$) with suitable cations, or as mixtures of free acids and salts in any ratio. Suitable cations include but are not limited to $Li^+$, $Na^+$, $K^+$, $NH_4^+$, $Ca^{2+}$, $Mg^{2+}$ and the like.

For the purpose to the specification and as commonly acknowledged, carbonic acid is no organic acid. Thus, carbonic acid and its salts such as sodium hydrogen carbonate and disodium carbonate are neither to be regarded as first organic acid, second organic acid, nor optionally present one or more additional organic acids. Preferably, the polymer composition according to the invention contains neither carbonic acid nor a salt thereof. Preferably, the polymer composition according to the invention contains neither acrylic acid, nor methacrylic acid nor a salt thereof.

Preferably, the first organic acid, the second organic acid and the optionally present one or more additional organic acids independently of one another are present as free acids (e.g. $-CO_2H$).

When the first organic acid, the second organic acid and the optionally present one or more additional organic acids are present as mixtures of free acids (protonated acidic functional groups) and salts (deprotonated acidic functional groups), the molar content of deprotonated acidic functional groups (e.g. $-CO_2^-$) is preferably at most about 25 mol.-%, more preferably at most about 20 mol.-%, still more preferably at most about 15 mol.-%, yet more preferably at most about 10 mol.-%, even more preferably at most about 5.0 mol.-%, most preferably at most about 2.5 mol.-%, and in particular at most about 1.0 mol.-%, in each case relative to the total molar content of all protonated acidic functional groups (i.e. $-CO_2H$) and all deprotonated acidic functional groups (e.g. $-CO_2^-$).

The first organic acid, the second organic acid and the optionally present one or more additional organic acids independently of one another may be present in any form, e.g. amorphous, crystalline, liquid, polymorphous, and may be present in anhydrous form or in form of solvates, e.g. hydrates. For example, oxalic acid may be present in anhydrous form (oxalic acid, CAS no. 144-62-7) or in form of the dihydrate (oxalic acid dihydrate, CAS no. 6153-56-6).

For the purpose of the specification, all values and weight percentages are to be regarded as equivalent values and weight percentages relative to the anhydrous non-salt form of the acid.

Preferably, the first organic acid, the second organic acid and the optionally present one or more additional organic acids independently have a $pK_A$ value of at most about 6.5, more preferably at most about 6.0, still more preferably at most about 5.5, yet more preferably at most about 5.0, even more preferably at most 4.5, most preferably at most about 4.0, and in particular at most about 3.5. When the first organic acid, the second organic acid and the optionally present one or more additional organic acids bear more than a single acidic functional group, preferably at least one of the acidic functional groups satisfies this requirement.

Preferably, the organic acid component comprises at least one multifunctional organic acid, i.e. preferably the first organic acid, and/or the second organic acid, and/or the optionally present one or more additional organic acids is a multifunctional organic acid. For the purpose of the specification, a multifunctional organic acid has at least two acidic functional groups, preferably at least two carboxylic groups. Multifunctional organic acids may act as curing agent according to the invention, provided that a polymer contained in the polymer composition is a curable polymer bearing functional groups that at elevated temperature are capable of reacting with the acidic functional groups of the multifunctional organic acid, such as glycidyl groups, amine groups, hydroxyl groups, mercaptane groups, and the like.

Preferably, the first organic acid, the second organic acid and the optionally present one or more additional organic acids in pure form independently of one another are solid at room temperature (23° C.).

Preferably, the first organic acid, the second organic acid and the optionally present one or more additional organic acids are carboxylic acids.

Nonetheless, the term "organic acid" according to the invention also encompasses organic compounds which have no carboxylic acidic functional group such as phenolic-type acids, vinylogous carboxylic acids, and carbon based acids (for details it is referred to G. V. Perez et al., Journal of Chemical Education, 77(7), 2000, 910-915). A preferred example of a vinylogous carboxylic acid according to the invention is ascorbic acid. Of course, other acidic functional groups may also render an organic compound an "organic acid" within the meaning of the invention, e.g. —$PO_2H$, —$PO_3H_2$, —$OPO_3H_2$, —$SO_3H$, —$OSO_3H$, and the like, and may optionally be present in combination with e.g. carboxylic acidic functional groups.

Preferably, however, the first organic acid, the second organic acid, and the optionally present one or more additional organic acids independently of one another are exclusively composed of (i.e. consist of) the elements C, H, O and optionally N, more preferably C, H, and O.

Preferably, the organic acid component, when being heated to the activation of expansion temperature, is capable of releasing carbon dioxide, i.e. carbon dioxide which causes volume expansion of the polymer composition, and at least partially, preferably exclusively, originates from the organic acid component, i.e. preferably does not originate from any constituent of the polymer composition other than the organic acid component.

In a preferred embodiment of the polymer composition according to the invention, the content of the organic acid component is at least about 0.1 wt.-%, more preferably at least about 1.0 wt.-%, still more preferably at least about 2.5 wt.-%, yet more preferably at least about 5.0 wt.-%, even more preferably at least about 7.5 wt.-%, most preferably at least about 10 wt.-%, and in particular at least about 12.5 wt.-%, relative to the total weight of the polymer composition.

In a preferred embodiment of the polymer composition according to the invention, the content of the organic acid component is within the range of from about 0.1 to about 40 wt.-%, preferably about 5.0 to about 30 wt.-%, in each case relative to the total weight of the polymer composition. Preferably, the content of the organic acid component is within the range of about 10±7.5 wt.-%, or about 10±5.0 wt.-%, or about 10±2.5 wt.-%, or about 12.5±10 wt.-%, or about 12.5±7.5 wt.-%, or about 12.5±5.0 wt.-%, or about 12.5±2.5 wt.-%, or about 15±12.5 wt.-%, or about 15±10 wt.-%, or about 15±7.5 wt.-%, or about 15±5.0 wt.-%, or about 15±2.5 wt.-%, or about 17.5±12.5 wt.-%, or about 17.5±10 wt.-%, or about 17.5±7.5 wt.-%, or about 17.5±5.0 wt.-%, or about 17.5±2.5 wt.-%, or about 20±10 wt.-%, or about 20±7.5 wt.-%, or about 20±5.0 wt.-%, or about 20±2.5 wt.-%, or about 22.5±7.5 wt.-%, or about 22.5±5.0 wt.-%, or about 22.5±2.5 wt.-%, or about 25±5.0 wt.-%, or about 25±2.5 wt.-%, or about 27.5±2.5 wt.-%, relative to the total weight of the polymer composition.

In a preferred embodiment of the polymer composition according to the invention, the organic acid component essentially consists of the first organic acid and the second organic acid. In another preferred embodiment of the polymer composition according to the invention, the organic acid component comprises one or more additional organic acids.

In a preferred embodiment of the polymer composition according to the invention, the first organic acid and/or the second organic acid and/or the optionally present one or more additional organic acids independently of one another are hydrocarbons comprising no functional groups other than carboxylic acid groups (—$CO_2H$), which independently of one another may be protonated or deprotonated, carbonyl groups (—C(=O)—), hydroxyl groups (—OH) and vinylogous carboxylic acid groups (—C(=O)—C=C—OH).

In a preferred embodiment of the polymer composition according to the invention, the first organic acid is selected from
(i) monocarboxylic acids, dicarboxylic acids, tricarboxylic acids, tetracarboxylic acids, hydroxycarboxylic acids, aminocarboxylic acids, alpha,beta-unsaturated carboxylic acids, alpha-phenyl carboxylic acids, alpha-nitro carboxylic acids, alpha-cyano carboxylic acids and ketocarboxylic acids, preferably selected from dicarboxylic acids and ketocarboxylic acids and hydroxycarboxylic acids; and/or
(ii) saturated or unsaturated aliphatic carboxylic acids; and/or
(iii) aliphatic carboxylic acids, cycloaliphatic carboxylic acids, heterocycloaliphatic carboxylic acids, aromatic carboxylic acids or heteroaromatic carboxylic acids.

For the purpose of the specification, citric acid may alternatively be regarded as tricarboxylic acid or as hydroxycarboxylic acid.

In a preferred embodiment of the polymer composition according to the invention, the second organic acid is selected from
(i) monocarboxylic acids, dicarboxylic acids, tricarboxylic acids, tetracarboxylic acids, hydroxycarboxylic acids, aminocarboxylic acids, alpha,beta-unsaturated carboxylic acids, alpha-phenyl carboxylic acids, alpha-nitro carboxylic acids, alpha-cyano carboxylic acids and ketocarboxylic acids, preferably selected from dicarboxylic acids and ketocarboxylic acids and hydroxycarboxylic acids; and/or
(ii) saturated or unsaturated aliphatic carboxylic acids; and/or
(iii) aliphatic carboxylic acids, cycloaliphatic carboxylic acids, heterocycloaliphatic carboxylic acids, aromatic carboxylic acids or heteroaromatic carboxylic acids.

In a preferred embodiment of the polymer composition according to the invention, the optionally present one or more additional organic acids independently of one another are selected from
(i) monocarboxylic acids, dicarboxylic acids, tricarboxylic acids, tetracarboxylic acids, hydroxycarboxylic acids, aminocarboxylic acids, alpha,beta-unsaturated carboxylic acids, alpha-phenyl carboxylic acids, alpha-nitro carboxylic acids, alpha-cyano carboxylic acids and ketocarboxylic acids, preferably selected from dicarboxylic acids and ketocarboxylic acids and hydroxycarboxylic acids; and/or
(ii) saturated or unsaturated aliphatic carboxylic acids; and/or
(iii) aliphatic carboxylic acids, cycloaliphatic carboxylic acids, heterocycloaliphatic carboxylic acids, aromatic carboxylic acids or heteroaromatic carboxylic acids.

In a preferred embodiment of the polymer composition according to the invention, the first organic acid and/or the second organic acid and/or the optionally present one or more additional organic acids is a saturated or unsaturated aliphatic monocarboxylic acid, which may optionally comprise at least one carbonyl group and/or which may optionally comprise at least one hydroxyl group.

Preferably, the first organic acid and/or the second organic acid and/or the optionally present one or more additional organic acids is an alpha-keto acid having the general formula $R^1$—C(=O)—$CO_2H$, wherein $R^1$ means —H, saturated or unsaturated —$C_1$-$C_8$-alkyl, saturated or unsaturated —$C_3$-$C_8$-cycloalkyl, saturated or unsaturated heterocycloalkyl, —$C_6$-$C_{10}$-aryl or —$C_1$-$C_9$-heteroaryl. Preferably, the alpha-keto acid is glyoxylic acid or pyruvic acid.

Preferably, the first organic acid and/or the second organic acid and/or the optionally present one or more additional organic acids is a beta-keto acid having the general formula $R^2$—C(=O)—$CR^3R^4$—$CO_2H$, wherein $R^2$, $R^3$ and $R^4$ independently of one another mean —H, saturated or unsaturated —$C_1$-$C_8$-alkyl, saturated or unsaturated —$C_3$-$C_8$-cycloalkyl, saturated or unsaturated heterocycloalkyl, —$C_6$-$C_{10}$-aryl or —$C_1$-$C_9$-heteroaryl. Preferably, the beta-keto acid is acetoacetic acid.

Preferably, the first organic acid and/or the second organic acid and/or the optionally present one or more additional organic acids is an alpha-amino acid having the general formula $R^7$—CH($NH_2$)—$CO_2H$, wherein $R^7$ means —H, saturated or unsaturated —$C_1$-$C_8$-alkyl, saturated or unsaturated —$C_3$-$C_8$-cycloalkyl, saturated or unsaturated heterocycloalkyl, —$C_6$-$C_{10}$-aryl or —$C_1$-$C_9$-heteroaryl.

Preferably, the saturated or unsaturated aliphatic monocarboxylic acid is selected from the group consisting of formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, acrylic acid, methacrylic acid, lactic acid, glycolic acid, pyruvic acid, and acetoacetic acid.

In a preferred embodiment of the polymer composition according to the invention, the first organic acid and/or the second organic acid and/or the optionally present one or more additional organic acids is an aromatic monocarboxylic acid, which may optionally comprise at least one carbonyl group and/or which may optionally comprise at least one hydroxyl group. Preferably, the aromatic monocarboxylic acid is selected from the group consisting of benzoic acid, salicyclic acid and mandelic acid.

In a preferred embodiment of the polymer composition according to the invention, the first organic acid and/or the second organic acid and/or the optionally present one or more additional organic acids is a saturated or unsaturated aliphatic dicarboxylic acid, which may optionally comprise at least one carbonyl group and/or which may optionally comprise at least one hydroxyl group.

Preferably, the saturated or unsaturated aliphatic dicarboxylic acid is malonic acid or a malonic acid derivative having the general formula $HO_2C$—$CR^5R^6$—$CO_2H$, wherein $R^5$ and $R^6$ independently of one another mean —H, saturated or unsaturated —$C_1$-$C_8$-alkyl, saturated or unsaturated —$C_3$-$C_8$-cycloalkyl, saturated or unsaturated heterocycloalkyl, —$C_6$-$C_{10}$-aryl or —$C_1$-$C_9$-heteroaryl.

Preferably, the saturated or unsaturated aliphatic dicarboxylic acid is selected from the group consisting of oxalic acid, malonic acid, succinic acid, glutaric acid, adipic acid, pimelic acid, suberic acid, azelaic acid, sebacic acid, maleic acid, fumaric acid, glutaconic acid, traumatic acid, muconic acid, glutinic acid, citraconic acid, mesaconic acid, malic acid, aspartic acid, glutamic acid, tartronic acid, tartaric acid, saccharic acid, mesoxalic acid, oxaloacetic acid, and acetonedicarboxylic acid.

In a preferred embodiment of the polymer composition according to the invention, the first organic acid and/or the second organic acid and/or the optionally present one or more additional organic acids is an aromatic dicarboxylic acid, which may optionally comprise at least one carbonyl group and/or which may optionally comprise at least one hydroxyl group. Preferably, the aromatic dicarboxylic acid is selected from the group consisting of phthalic acid, isophthalic acid, terephthalic acid, diphenic acid, and 2,6-naphthalenedicarboxylic acid.

In a preferred embodiment of the polymer composition according to the invention, the first organic acid and/or the second organic acid and/or the optionally present one or more additional organic acids is a saturated or unsaturated aliphatic tricarboxylic acid, which may optionally comprise at least one carbonyl group and/or which may optionally comprise at least one hydroxyl group. Preferably, the saturated or unsaturated aliphatic tricarboxylic acid is selected from the group consisting of citric acid, isocitric acid, aconitic acid, propane-1,2,3-tricarboxylic acid, and trimesic acid.

In a preferred embodiment of the polymer composition according to the invention, the first organic acid and/or the second organic acid and/or the optionally present one or more additional organic acids is an aromatic tricarboxylic acid, which may optionally comprise at least one carbonyl group and/or which may optionally comprise at least one hydroxyl group. Preferably, the aromatic tricarboxylic acid is selected from the group consisting of trimellitic acid.

In a preferred embodiment of the polymer composition according to the invention, the first organic acid and/or the second organic acid and/or the optionally present one or more additional organic acids is a saturated or unsaturated aliphatic tetracarboxylic acid, which may optionally comprise at least one carbonyl group and/or which may optionally comprise at least one hydroxyl group. Preferably, the saturated or unsaturated aliphatic tetracarboxylic acid is ethylenediamine tetraacetic acid or tetrahydrofuran-2,3,4,5-tetracarboxylic acid.

In a preferred embodiment of the polymer composition according to the invention, the first organic acid and/or the second organic acid and/or the optionally present one or more additional organic acids is an aromatic tetracarboxylic acid, which may optionally comprise at least one carbonyl group and/or which may optionally comprise at least one hydroxyl group. Preferably, the aromatic tetracarboxylic acid is benzene tetracarboxylic acid.

In a preferred embodiment of the polymer composition according to the invention, the first organic acid and/or the second organic acid and/or the optionally present one or more additional organic acids is a vinylogous carboxylic acid, which may optionally comprise at least one carbonyl group and/or which may optionally comprise at least one hydroxyl group. Preferably, the vinylogous carboxylic acid is ascorbic acid.

Especially preferred binary combinations of first organic acid and second organic acid include but are not limited to RR, RS, RT, RU, RV, RW, RX, RY, RZ; SR, SS, ST, SU, SV, SW, SX, SY, SZ; TR, TS, T, TU, TV, TW, TX, TY, TZ; UR, US, UT, UU, UV, UW, UX, UY, UZ; VR, VS, VT, VU, VV, VW, VX, VY, VZ; WR, WS, WT, WU, WV, WW, WX, WY, WZ; XR, XS, XT, XU, XV, XW, XX, XY, XZ; YR, YS, YT, YU, YV, YW, YX, YY, YZ; ZR, ZS, ZT, ZU, ZV, ZW, ZX, ZY, or ZZ; wherein in each case the first abbreviation represents the first organic acid and the second abbreviation represents the second organic acid and wherein the abbreviations R, S, T, U, V, W, X, Y, Z have the following meaning:

| | |
|---|---|
| R | saturated or unsaturated aliphatic monocarboxylic acid, which may optionally comprise at least one carbonyl group and/or which may optionally comprise at least one hydroxyl group |
| S | aromatic monocarboxylic acid, which may optionally comprise at least one carbonyl group and/or which may optionally comprise at least one hydroxyl group |

| | |
|---|---|
| T | saturated or unsaturated aliphatic dicarboxylic acid, which may optionally comprise at least one carbonyl group and/or which may optionally comprise at least one hydroxyl group |
| U | aromatic dicarboxylic acid, which may optionally comprise at least one carbonyl group and/or which may optionally comprise at least one hydroxyl group |
| V | saturated or unsaturated aliphatic tricarboxylic acid, which may optionally comprise at least one carbonyl group and/or which may optionally comprise at least one hydroxyl group |
| W | aromatic tricarboxylic acid, which may optionally comprise at least one carbonyl group and/or which may optionally comprise at least one hydroxyl group |
| X | saturated or unsaturated aliphatic tetracarboxylic acid, which may optionally comprise at least one carbonyl group and/or which may optionally comprise at least one hydroxyl group |
| Y | aromatic tetracarboxylic acid, which may optionally comprise at least one carbonyl group and/or which may optionally comprise at least one hydroxyl group |
| Z | vinylogous carboxylic acid, which may optionally comprise at least one carbonyl group and/or which may optionally comprise at least one hydroxyl group |

For example, when the binary combination is RS, the first organic acid is a saturated or unsaturated aliphatic monocarboxylic acid, which may optionally comprise at least one carbonyl group and/or which may optionally comprise at least one hydroxyl group, and the second organic acid is an aromatic monocarboxylic acid, which may optionally comprise at least one carbonyl group and/or which may optionally comprise at least one hydroxyl group. When both organic acids of the binary combination belong to the same class, e.g. TT, the first organic acid as well as the second organic acid are a saturated or unsaturated aliphatic dicarboxylic acid, which may optionally comprise at least one carbonyl group and/or which may optionally comprise at least one hydroxyl group, but differ from one another.

Especially preferred ternary combinations of first organic acid, second organic acid and one additional organic acid include but are not limited to RRR, RRS, RRT, RRU, RRV, RRW, RRX, RRY, RRZ; RSR, RSS, RST, RSU, RSV, RSW, RSX, RSY, RSZ; RTR, RTS, RTT, RTU, RTV, RTW, RTX, RTY, RTZ; RUR, RUS, RUT, RUU, RUV, RUW, RUX, RUY, RUZ; RVR, RVS, RVT, RVU, RVV, RVW, RVX, RVY, RVZ; RWR, RWS, RWT, RWU, RWV, RWW, RWX, RWY, RWZ; RXR, RXS, RXT, RXU, RXV, RXW, RXX, RXY, RXZ; RYR, RYS, RYT, RYU, RYV, RYW, RYX, RYY, RYZ; RZR, RZS, RZT, RZU, RZV, RZW, RZX, RZY, RZZ; SRR, SRS, SRT, SRU, SRV, SRW, SRX, SRY, SRZ; SSR, SSS, SST, SSU, SSV, SSW, SSX, SSY, SSZ; STR, STS, ST, STU, STV, STW, STX, STY, STZ; SUR, SUS, SUT, SUU, SUV, SUW, SUX, SUY, SUZ; SVR, SVS, SVT, SVU, SVV, SVW, SVX, SVY, SVZ; SWR, SWS, SWT, SWU, SWV, SWW, SWX, SWY, SWZ; SXR, SXS, SXT, SXU, SXV, SXW, SXX, SXY, SXZ; SYR, SYS, SYT, SYU, SYV, SYW, SYX, SYY, SYZ; SZR, SZS, SZT, SZU, SZV, SZW, SZX, SZY, SZZ; TRR, TRS, TRT, TRU, TRV, TRW, TRX, TRY, TRZ; TSR, TSS, TST, TSU, TSV, TSW, TSX, TSY, TSZ; TrR, TS, TTT, TTU, TTV, TTW, TTX, TTY, TTZ; TUR, TUS, TUT, TUU, TUV, TUW, TUX, TUY, TUZ; TVR, TVS, TVT, TVU, TVV, TVW, TVX, TVY, TVZ; TWR, TWS, TWT, TWU, TWV, TWW, TWX, TWY, TWZ; TXR, TXS, TXT, TXU, TXV, TXW, TXX, TXY, TXZ; TYR, TYS, TYT, TYU, TYV, TYW, TYX, TYY, TYZ; TZR, TZS, TZT, TZU, TZV, TZW, TZX, TZY, TZZ; URR, URS, URT, URU, URV, URW, URX, URY, URZ; USR, USS, UST, USU, USV, USW, USX, USY, USZ; UTR, UTS, UTT, UTU, UTV, UTW, UTX, UTY, UTZ; UUR, UUS, UUT, UUU, UUV, UUW, UUX, UUY, UUZ; UVR, UVS, UVT, UVU, UVV, UVW, UVX, UVY, UVZ; UWR, UWS, UWT, UWU, UWV, UWW, UWX, UWY, UWZ; UXR, UXS, UXT, UXU, UXV, UXW, UXX, UXY, UXZ; UYR, UYS, UYT, UYU, UYV, UYW, UYX, UYY, UYZ; UZR, UZS, UZT, UZU, UZV, UZW, UZX, UZY, UZZ; VRR, VRS, VRT, VRU, VRV, VRW, VRX, VRY, VRZ; VSR, VSS, VST, VSU, VSV, VSW, VSX, VSY, VSZ; VTR, VTS, VTT, VTU, VTV, VTW, VTX, VTY, VTZ; VUR, VUS, VUT, VUU, VUV, VUW, VUX, VUY, VUZ; VVR, VVS, VVT, VVU, VVV, VVW, VVX, VVY, VVZ; VWR, VWS, VWT, VWU, VWV, VWW, VWX, VWY, VWZ; VXR, VXS, VXT, VXU, VXV, VXW, VXX, VXY, VXZ; VYR, VYS, VYT, VYU, VYV, VYW, VYX, VYY, VYZ; VZR, VZS, VZT, VZU, VZV, VZW, VZX, VZY, VZZ; WRR, WRS, WRT, WRU, WRV, WRW, WRX, WRY, WRZ; WSR, WSS, WST, WSU, WSV, WSW, WSX, WSY, WSZ; WTR, WTS, WTT, WTU, WTV, WTW, WTX, WTY, WTZ; WUR, WUS, WUT, WUU, WUV, WUW, WUX, WUY, WUZ; WVR, WVS, WVT, WVU, WVV, WVW, WVX, WVY, WVZ; WWR, WWS, WWT, WWU, WWV, WWW, WWX, WWY, WWZ; WXR, WXS, WXT, WXU, WXV, WXW, WXX, WXY, WXZ; WYR, WYS, WYT, WYU, WYV, WYW, WYX, WYY, WYZ; WZR, WZS, WZT, WZU, WZV, WZW, WZX, WZY, WZZ; XRR, XRS, XRT, XRU, XRV, XRW, XRX, XRY, XRZ; XSR, XSS, XST, XSU, XSV, XSW, XSX, XSY, XSZ; XTR, XTS, XTT, XTU, XTV, XTW, XTX, XTY, XTZ; XUR, XUS, XUT, XUU, XUV, XUW, XUX, XUY, XUZ; XVR, XVS, XVT, XVU, XVV, XVW, XVX, XVY, XVZ; XWR, XWS, XWT, XWU, XWV, XWW, XWX, XWY, XWZ; XXR, XXS, XXT, XXU, XXV, XXW, XXX, XXY, XXZ; XYR, XYS, XYT, XYU, XYV, XYW, XYX, XYY, XYZ; XZR, XZS, XZT, XZU, XZV, XZW, XZX, XZY, XZZ; YRR, YRS, YRT, YRU, YRV, YRW, YRX, YRY, YRZ; YSR, YSS, YST, YSU, YSV, YSW, YSX, YSY, YSZ; YTR, YTS, YTT, YTU, YTV, YTW, YTX, YTY, YTZ; YUR, YUS, YUT, YUU, YUV, YUW, YUX, YUY, YUZ; YVR, YVS, YVT, YVU, YVV, YVW, YVX, YVY, YVZ; YWR, YWS, YWT, YWU, YWV, YWW, YWX, YWY, YWZ; YXR, YXS, YXT, YXU, YXV, YXW, YXX, YXY, YXZ; YYR, YYS, YYT, YYU, YYV, YYW, YYX, YYY, YYZ; YZR, YZS, YZT, YZU, YZV, YZW, YZX, YZY, YZZ; ZRR, ZRS, ZRT, ZRU, ZRV, ZRW, ZRX, ZRY, ZRZ; ZSR, ZSS, ZST, ZSU, ZSV, ZSW, ZSX, ZSY, ZSZ; ZTR, ZTS, ZTT, ZTU, ZTV, ZTW, ZTX, ZTY, ZTZ; ZUR, ZUS, ZUT, ZUU, ZUV, ZUW, ZUX, ZUY, ZUZ; ZVR, ZVS, ZVT, ZVU, ZVV, ZVW, ZVX, ZVY, ZVZ; ZWR, ZWS, ZWT, ZWU, ZWV, ZWW, ZWX, ZWY, ZWZ; ZXR, ZXS, ZXT, ZXU, ZXV, ZXW, ZXX, ZXY, ZXZ; ZYR, ZYS, ZYT, ZYU, ZYV, ZYW, ZYX, ZYY, ZYZ; ZZR, ZZS, ZZT, ZZU, ZZV, ZZW, ZZX, ZZY, or ZZZ; wherein in each case the first abbreviation represents the first organic acid, the second abbreviation represents the second organic acid, the third abbreviation represents the one additional organic acid, and wherein the abbreviations R, S, T, U, V, W, X, Y, Z have the above meaning.

In a preferred embodiment of the polymer composition according to the invention, the first organic acid and the second organic acid and the optionally present one or more additional organic acids are selected from the group consisting of ascorbic acid, citric acid, glutaric acid, tartaric acid, lactic acid, maleic acid, malic acid, malonic acid, oxalic acid, pyruvic acid, and valeric acid.

In a preferred embodiment of the polymer composition according to the invention, the first organic acid is a saturated or unsaturated aliphatic dicarboxylic acid, which may optionally comprise at least one hydroxyl group. Preferably, the saturated or unsaturated aliphatic dicarboxylic acid (first organic acid) is oxalic acid. In a preferred embodiment, the second organic acid is a saturated or unsaturated aliphatic dicarboxylic acid, which may optionally comprise at least one hydroxyl group. In a preferred embodiment, the saturated or unsaturated aliphatic dicarboxylic acid (second organic acid) is malonic acid. In another preferred embodiment, the saturated or unsaturated aliphatic dicarboxylic acid (second organic acid) is maleic acid. In still another preferred embodiment, the saturated or unsaturated aliphatic dicarboxylic acid (second organic acid) is malic acid. In another preferred embodiment, the second organic acid is a saturated or unsaturated aliphatic monocarboxylic acid, which may optionally comprise at least one carbonyl group and/or which may optionally comprise at least one hydroxyl group. Preferably, the saturated or unsaturated aliphatic monocarboxylic acid (second organic acid) is pyruvic acid. In still another preferred embodiment, the second organic acid is a saturated or unsaturated aliphatic tricarboxylic acid, which may optionally comprise at least one carbonyl group and/or which may optionally comprise at least one hydroxyl group. Preferably, the saturated or unsaturated aliphatic tricarboxylic acid (second organic acid) is citric acid.

In a preferred embodiment of the polymer composition according to the invention, the first organic acid is a saturated or unsaturated aliphatic dicarboxylic acid, preferably oxalic acid, and the second organic acid is a saturated or unsaturated aliphatic tricarboxylic acid, which may optionally comprise at least one carbonyl group and/or which may optionally comprise at least one hydroxyl group, preferably citric acid. Preferably, the organic acid component comprises one additional organic acid. In a preferred embodiment, the additional organic acid is a saturated or unsaturated aliphatic monocarboxylic acid, which may optionally comprise at least one carbonyl group and/or which may optionally comprise at least one hydroxyl group. Preferably, the saturated or unsaturated aliphatic monocarboxylic acid (additional organic acid) is pyruvic acid. In another preferred embodiment, the additional organic acid is a saturated or unsaturated aliphatic dicarboxylic acid, which may optionally comprise at least one hydroxyl group. Preferably, the saturated or unsaturated aliphatic dicarboxylic acid (additional organic acid) is malic acid. In another preferred embodiment, the additional organic acid is a vinylogous carboxylic acid, which may optionally comprise at least one carbonyl group and/or which may optionally comprise at least one hydroxyl group. Preferably, the vinylogous carboxylic acid (additional organic acid) is ascorbic acid.

In a preferred embodiment of the polymer composition according to the invention, the relative weight ratio of the first organic acid to the second organic acid is within the range of from about 10:1 to 1:10, more preferably from about 5:1 to 1:5, still more preferably from about 3:1 to 1:3. According to this embodiment, the organic acid component preferably consists of the first organic acid and the second organic acid.

In another preferred embodiment, the relative weight ratio of the first organic acid to the second organic acid is within the range of from about 10:1 to 1.1:1, more preferably from about 5:1 to 1.1:1, still more preferably from about 3:1 to 1.1:1. According to this embodiment, the organic acid component preferably consists of the first organic acid and the second organic acid.

In still another preferred embodiment, the relative weight ratio of the first organic acid to the second organic acid is within the range of from about 1:10 to 1:1.1, more preferably from about 1:5 to 1:1.1, still more preferably from about 1:3 to 1:1.1. According to this embodiment, the organic acid component preferably consists of the first organic acid and the second organic acid.

In another preferred embodiment, the organic acid component comprises one additional acid and the relative weight ratio of the first organic acid to the second organic acid to the one additional organic acid is within the range of about $(60\pm20):(20\pm7):(20\pm7)$, or about $(20\pm7):(60\pm20):(20\pm7)$, or about $(20\pm7):(20\pm7):(60\pm20)$. According to this embodiment, the organic acid component preferably consists of the first organic acid, the second organic acid and the one additional organic acid.

In still another preferred embodiment, the organic acid component comprises one additional acid and the relative weight ratio of the first organic acid to the second organic acid to the one additional organic acid is within the range of about $(75\pm25):(15\pm5):(10\pm3)$, or about $(75\pm25):(10\pm3):(15\pm5)$, or about $(15\pm5):(75\pm25):(10\pm3)$, or about $(10\pm3):(75\pm25):(15\pm5)$, or about $(15\pm5):(10\pm3):(75\pm25)$, or about $(10\pm3):(15\pm5):(75\pm25)$. According to this embodiment, the organic acid component preferably consists of the first organic acid, the second organic acid and the one additional organic acid.

Especially preferred binary combinations of first organic acid and second organic acid include but are not limited to, AB, AC, AD, AE, AF, AG, AH, AI, AJ; BC, BD, BE, BF, BG, BH, BI, BJ; CD, CE, CF, CG, CH, CI, CJ; DE, DF, DG, DH, DI, DJ; EF, EG, EH, EI, EJ; FG, FH, FI, FJ; GH, GI, GJ; HI, HJ; and IJ; wherein in each case the abbreviations A, B, C, D, E, F, G, H, I and J have the following meaning:

| | |
|---|---|
| A | ascorbic acid |
| B | citric acid |
| C | glutaric acid |
| D | tartaric acid |
| E | maleic acid |
| F | malic acid |
| G | malonic acid |
| H | oxalic acid |
| I | pyruvic acid |
| J | valeric acid |

For example, the embodiment abbreviated as "BF" refers to a combination of citric acid (first named organic acid B) with malic acid (second named organic acid F).

In preferred embodiments in accordance with the above definitions and abbreviations, the relative weight ratio of the first named organic acid to the second named organic acid is within the range of from about 10:1 to 1:10 ($=^1$). In another preferred embodiment, the relative weight ratio of the first named organic acid to the second named organic acid is within the range of from about 5:1 to 1:5 ($=^2$). In still another preferred embodiment, the relative weight ratio of the first named organic acid to the second named organic acid is within the range of from about 3:1 to 1:3 ($=^3$). In other preferred embodiments in accordance with the above definitions and abbreviations, the first named organic acid is present in excess relative to the second named organic acid ($=^4$). In a preferred embodiment, the relative weight ratio of the first named organic acid to the second named organic acid is within the range of from about 10:1 to 1.1:1 ($=^5$). In another preferred embodiment, the relative weight ratio of the first named organic acid to the second named organic acid is within the range of from about 5:1 to 1.1:1 ($=^6$). In still another preferred embodiment, the relative weight ratio of the first named organic acid to the second named organic acid is within the range of from about 3:1 to 1.1:1 ($=^7$). In still other preferred embodiments in accordance with the above definitions and abbreviations, the second named organic acid is present in excess relative to the first named organic acid ($=^8$). In a preferred embodiment, the relative weight ratio of the first named organic acid to the second named organic acid is within the range of from about 1:10 to 1:1.1 ($=^9$). In another preferred embodiment, the relative weight ratio of the first named organic acid to the second named organic acid is within the range of from about 1:5 to 1:1.1 ($=^{10}$). In still another preferred embodiment, the relative weight ratio of the first named organic acid to the second named organic acid is within the range of from about 1:3 to 1:1.1 ($=^{11}$).

Especially preferred binary combinations of first organic acid and second organic acid (A to J) and relative weight ratios ($^1$ to $^{11}$) include but are not limited to $AB^1$, $AC^1$, $AD^1$, $AE^1$, $AF^1$, $AG^1$, $AH^1$, $AI^1$, $AJ^1$; $BC^1$, $BD^1$, $BE^1$, $BF^1$, $BG^1$, $BH^1$, $BI^1$, $BJ^1$; $CD^1$, $CE^1$, $CF^1$, $CG^1$, $CH^1$, $CI^1$, $CJ^1$; $DE^1$, $DF^1$, $DG^1$, $DH^1$, $DI^1$, $DJ^1$; $EF^1$, $EG^1$, $EH^1$, $EI^1$, $EJ^1$; $FG^1$, $FH^1$, $FI^1$, $FJ^1$; $GH^1$, $GI^1$, $GJ^1$; $HI^1$, $HJ^1$; $IJ^1$; $AB^2$, $AC^2$, $AD^2$, $AE^2$, $AF^2$, $AG^2$, $AH^2$, $AI^2$, $AJ^2$; $BC^2$, $BD^2$, $BE^2$, $BF^2$, $BG^2$, $BH^2$, $BI^2$, $BJ^2$; $CD^2$, $CE^2$, $CF^2$, $CG^2$, $CH^2$, $CI^2$, $CJ^2$; $DE^2$, $DF^2$, $DG^2$, $DH^2$, $DI^2$, $DJ^2$; $EF^2$, $EG^2$, $EH^2$, $EI^2$, $EJ^2$; $FG^2$, $FH^2$, $FI^2$, $FJ^2$; $GH^2$, $GI^2$, $GJ^2$; $HI^2$, $HJ^2$; $IJ^2$; $AB^3$, $AC^3$, $AD^3$, $AE^3$, $AF^3$, $AG^3$, $AH^3$, $AI^3$, $AJ^3$; $BC^3$, $BD^3$, $BE^3$, $BF^3$, $BG^3$, $BH^3$, $BI^3$, $BJ^3$; $CD^3$, $CE^3$, $CF^3$, $CG^3$, $CH^3$, $CI^3$, $CJ^3$; $DE^3$, $DF^3$, $DG^3$, $DH^3$, $DI^3$, $DJ^3$; $EF^3$, $EG^3$, $EH^3$, $EI^3$, $EJ^3$; $FG^3$, $FH^3$, $FI^3$, $FJ^3$; $GH^3$, $GI^3$, $GJ^3$; $HI^3$, $HJ^3$; $IJ^3$; $AB^4$, $AC^4$, $AD^4$, $AE^4$, $AF^4$, $AG^4$, $AH^4$, $AI^4$, $AJ^4$; $BC^4$, $BD^4$, $BE^4$, $BF^4$, $BG^4$, $BH^4$, $BI^4$, $BJ^4$; $CD^4$, $CE^4$, $CF^4$, $CG^4$, $CH^4$, $CI^4$, $CJ^4$; $DE^4$, $DF^4$, $DG^4$, $DH^4$, $DI^4$, $DJ^4$; $EF^4$, $EG^4$, $EH^4$, $EI^4$, $EJ^4$; $FG^4$, $FH^4$, $FI^4$, $FJ^4$; $GH^4$, $GI^4$, $GJ^4$; $HI^4$, $HJ^4$; $IJ^4$; $AB^5$, $AC^5$, $AD^5$, $AE^5$, $AF^5$, $AG^5$, $AH^5$, $AI^5$, $AJ^5$; $BC^5$, $BD^5$, $BE^5$, $BF^5$, $BG^5$, $BH^5$, $BI^5$, $BJ^5$; $CD^5$, $CE^5$, $CF^5$, $CG^5$, $CH^5$, $CI^5$, $CJ^5$; $DE^5$, $DF^5$, $DG^5$, $DH^5$, $DI^5$, $DJ^5$; $EF^5$, $EG^5$, $EH^5$, $EI^5$, $EJ^5$; $FG^5$, $FH^5$, $FI^5$, $FJ^5$; $GH^5$, $GI^5$, $GJ^5$; $HI^5$, $HJ^5$; $IJ^5$; $AB^6$, $AC^6$, $AD^6$, $AE^6$, $AF^6$, $AG^6$, $AH^6$, $AI^6$, $AJ^6$; $BC^6$, $BD^6$, $BE^6$, $BF^6$, $BG^6$, $BH^6$, $BI^6$, $BJ^6$; $CD^6$, $CE^6$, $CF^6$, $CG^6$, $CH^6$, $CI^6$, $CJ^6$; $DE^6$, $DF^6$, $DG^6$, $DH^6$, $DI^6$, $DJ^6$; $EF^6$, $EG^6$, $EH^6$, $EI^6$, $EJ^6$; $FG^6$, $FH^6$, $FI^6$, $FJ^6$; $GH^6$, $GI^6$, $GJ^6$; $HI^6$, $HJ^6$; $IJ^6$; $AB^7$, $AC^7$, $AD^7$, $AE^7$, $AF^7$, $AG^7$, $AH^7$, $AI^7$, $AJ^7$; $BC^7$, $BD^7$, $BE^7$, $BF^7$, $BG^7$, $BH^7$, $BI^7$, $BJ^7$; $CD^7$, $CE^7$, $CF^7$, $CG^7$, $CH^7$, $CI^7$, $CJ^7$; $DE^7$, $DF^7$, $DG^7$, $DH^7$, $DI^7$, $DJ^7$; $EF^7$, $EG^7$, $EH^7$, $EI^7$, $EJ^7$; $FG^7$, $FH^7$, $FI^7$, $FJ^7$; $GH^7$, $GI^7$, $GJ^7$; $HI^7$, $HJ^7$; $IJ^7$; $AB^8$, $AC^8$, $AD^8$, $AE^8$, $AF^8$, $AG^8$, $AH^8$, $AI^8$, $AJ^8$; $BC^8$, $BD^8$, $BE^8$, $BF^8$, $BG^8$, $BH^8$, $BI^8$, $BJ^8$; $CD^8$, $CE^8$, $CF^8$, $CG^8$, $CH^8$, $CI^8$, $CJ^8$; $DE^8$, $DF^8$, $DG^8$, $DH^8$, $DI^8$, $DJ^8$; $EF^8$, $EG^8$, $EH^8$, $EI^8$, $EJ^8$; $FG^8$, $FH^8$, $FI^8$, $FJ^8$; $GH^8$, $GI^8$, $GJ^8$; $HI^8$, $HJ^8$; $IJ^8$; $AB^9$, $AC^9$, $AD^9$, $AE^9$, $AF^9$, $AG^9$, $AH^9$, $AI^9$, $AJ^9$; $BC^9$, $BD^9$, $BE^9$, $BF^9$, $BG^9$, $BH^9$, $BI^9$, $BJ^9$; $CD^9$, $CE^9$, $CF^9$, $CG^9$, $CH^9$, $CI^9$, $CJ^9$; $DE^9$, $DF^9$, $DG^9$, $DH^9$, $DI^9$, $DJ^9$; $EF^9$, $EG^9$, $EH^9$, $EI^9$, $EJ^9$; $FG^9$, $FH^9$, $FI^9$, $FJ^9$; $GH^9$, $GI^9$, $GJ^9$; $HI^9$, $HJ^9$; $IJ^9$; $AB^{10}$, $AC^{10}$, $AD^{10}$, $AE^{10}$, $AF^{10}$, $AG^{10}$, $AH^{10}$, $AI^{10}$, $AJ^{10}$; $BC^{10}$, $BD^{10}$, $BE^{10}$, $BF^{10}$, $BG^{10}$, $BH^{10}$, $BI^{10}$, $BJ^{10}$; $CD^{10}$, $CE^{10}$, $CF^{10}$, $CG^{10}$, $CH^{10}$, $CI^{10}$, $CJ^{10}$; $DE^{10}$, $DF^{10}$, $DG^{10}$, $DH^{10}$, $DI^{10}$, $DJ^{10}$; $EF^{10}$, $EG^{10}$, $EH^{10}$, $EI^{10}$, $EJ^{11}$; $FG^{10}$, $FH^{10}$, $FI^{10}$, $FJ^{10}$; $GH^{10}$, $GI^{10}$, $GJ^{10}$; $HI^{10}$, $HJ^{10}$; $IJ^{10}$; $AB^{11}$, $AC^{11}$, $AD^{11}$, $AE^{11}$, $AF^{11}$, $AG^{11}$, $AH^{11}$, $AI^{11}$, $AJ^{11}$; $BC^{11}$, $BD^{11}$, $BE^{11}$, $BF^{11}$, $BG^{11}$, $BH^{11}$, $BI^{11}$, $BJ^{11}$; $CD^{11}$, $CE^{11}$, $CF^{11}$, $CG^{11}$, $CH^{11}$, $CI^{11}$, $CJ^{11}$; $DE^{11}$, $DF^{11}$, $DG^{11}$, $DH^{11}$, $DI^{11}$, $DJ^{11}$; $EF^{11}$, $EG^{11}$, $EH^{11}$, $EI^{11}$, $EJ^{11}$; $FG^{11}$, $FH^{11}$, $FI^{11}$, $FJ^{11}$; $GH^{11}$, $GI^{11}$, $GJ^{11}$; $HI^{11}$, $HJ^{11}$; $IJ^{11}$; wherein in each case the abbreviations A, B, C, D, E, F, G, H, I, J as well as $^1$, $^2$, $^3$, $^4$, $^5$, $^6$, $^7$, $^8$, $^9$, $^{10}$ and $^{11}$ have the above meaning. For example, the embodiment abbreviated as "$BF^9$" refers to a combination of citric acid (first named organic acid B) with malic acid (second named organic acid F), wherein the relative weight ratio of citric acid to malic acid is within the range of from about 1:10 to 1:1.1 (weight ratio $^9$).

Especially preferred ternary combinations of first organic acid and second organic acid and one additional organic acid include but are not limited to ABC, ABD, ABE, ABF, ABG, ABH, ABI, ABJ, ACD, ACE, ACF, ACG, ACH, ACI, ACJ, ADE, ADF, ADG, ADH, ADI, ADJ, AEF, AEG, AEH, AEI, AEJ, AFG, AFH, AFI, AFJ, AGH, AGI, AGJ, AHI, AHJ, AIJ; BCD, BCE, BCF, BCG, BCH, BCI, BCJ, BDE, BDF, BDG, BDH, BDI, BDJ, BEF, BEG, BEH, BEI, BEJ, BFG, BFH, BFI, BFJ, BGH, BGI, BGJ, BHI, BHJ, BIJ; CDE, CDF, CDG, CDH, CDI, CDJ, CEF, CEG, CEH, CEI, CEJ, CFG, CFH, CFI, CFJ, CGH, CGI, CGJ, CHI, CHJ, CIJ; DEF, DEG, DEH, DEI, DEJ, DFG, DFH, DFI, DFJ, DGH, DGI, DGJ, DHI, DHJ, DIJ; EFG, EFH, EFI, EFJ, EGH, EGI, EGJ, EHI, EHJ, EIJ; FGH, FGI, FGJ, FHI, FHJ, FIJ; GHI, GHJ, GIJ, and HIJ; wherein in each case the abbreviations A, B, C, D, E, F, G, H, I and J also have the above meaning. For example, the embodiment abbreviated as "AGH" refers to a combination of ascorbic acid (first named organic acid A) with malonic acid (second named organic acid G) and with oxalic acid (third named organic acid H).

In preferred embodiments in accordance with the above definitions and abbreviations, the relative weight ratio of the first named organic acid to the second named organic acid and to the one third additional organic acid is within the range of about (60±20):(20±7):(20±7) ($=^a$), or about (20±7):(60±20):(20±7) ($=^b$), or about (20±7):(20±7):(60±20) ($=^c$), or about (75±25):(15±5):(10±3) ($=^d$), or about (75±25):(10±3):(15±5) ($=^e$), or about (15±5):(75±25):(10±3) ($=^f$), or about (10±3):(75±25):(15±5) ($=^g$), or about (15±5):(10±3):(75±25) ($=^h$), or about (10±3):(15±5):(75±25) ($=^i$).

Especially preferred ternary combinations of first organic acid and second organic acid and one additional organic acid (A to J) and relative weight ratios ($^a$ to $^i$) include but are not limited to $ABC^a$, $ABD^a$, $ABE^a$, $ABF^a$, $ABG^a$, $ABH^a$, $ABI^a$, $ABJ^a$, $ACD^a$, $ACE^a$, $ACF^a$, $ACG^a$, $ACH^a$, $ACI^a$, $ACJ^a$, $ADE^a$, $ADF^a$, $ADG^a$, $ADH^a$, $ADI^a$, $ADJ^a$, $AEF^a$, $AEG^a$, $AEH^a$, $AEI^a$, $AEJ^a$, $AFG^a$, $AFH^a$, $AFI^a$, $AFJ^a$, $AGH^a$, $AGI^a$, $AGJ^a$, $AHI^a$, $AHJ^a$, $AIJ^a$; $BCD^a$, $BCE^a$, $BCF^a$, $BCG^a$, $BCH^a$, $BCI^a$, $BCJ^a$, $BDE^a$, $BDF^a$, $BDG^a$, $BDH^a$, $BDI^a$, $BDJ^a$, $BEF^a$, $BEG^a$, $BEH^a$, $BEI^a$, $BEJ^a$, $BFG^a$, $BFH^a$, $BFI^a$, $BFJ^a$, $BGH^a$, $BGI^a$, $BGJ^a$, $BHI^a$, $BHJ^a$, $BIJ^a$; $CDE^a$, $CDF^a$, $CDG^a$, $CDH^a$, $CDI^a$, $CDJ^a$, $CEF^a$, $CEG^a$, $CEH^a$, $CEI^a$, $CEJ^a$, $CFG^a$, $CFH^a$, $CFI^a$, $CFJ^a$, $CGH^a$, $CGI^a$, $CGJ^a$, $CHI^a$, $CHJ^a$, $CIJ^a$; $DEF^a$, $DEG^a$, $DEH^a$, $DEI^a$, $DEJ^a$, $DFG^a$, $DFH^a$, $DFI^a$, $DFJ^a$, $DGH^a$, $DGI^a$, $DGJ^a$, $DHI^a$, $DHJ^a$, $DIJ^a$; $EFG^a$, $EFH^a$, $EFI^a$, $EFJ^a$, $EGH^a$, $EGI^a$, $EGJ^a$, $EHI^a$, $EHJ^a$, $EIJ^a$; $FGH^a$, $FGI^a$, $FGJ^a$, $FHI^a$, $FHJ^a$, $FIJ^a$; $GHI^a$, $GHJ^a$, $GIJ^a$, $HIJ^a$; $ABC^b$, $ABD^b$, $ABE^b$, $ABF^b$, $ABG^b$, $ABH^b$, $ABI^b$, $ABJ^b$, $ACD^b$, $ACE^b$, $ACF^b$, $ACG^b$, $ACH^b$, $ACI^b$, $ACJ^b$, $ADE^b$, $ADF^b$, $ADG^b$, $ADH^b$, $ADI^b$, $ADJ^b$, $AEF^b$, $AEG^b$, $AEH^b$, $AEI^b$, $AEJ^b$, $AFG^b$, $AFH^b$, $AFI^b$, $AFJ^b$, $AGH^b$, $AGI^b$, $AGJ^b$, $AHI^b$, $AHJ^b$, $AIJ^b$; $BCD^b$, $BCE^b$, $BCF^b$, $BCG^b$, $BCH^b$, $BCI^b$, $BCJ^b$, $BDE^b$, $BDF^b$, $BDG^b$, $BDH^b$, $BDI^b$, $BDJ^b$, $BEF^b$, $BEG^b$, $BEH^b$, $BEI^b$, $BEJ^b$, $BFG^b$, $BFH^b$, $BFI^b$, $BFJ^b$, $BGH^b$, $BGI^b$, $BGJ^b$, $BHI^b$, $BHJ^b$, $BIJ^b$; $CDE^b$, $CDF^b$, $CDG^b$, $CDH^b$, $CDI^b$, $CDJ^b$, $CEF^b$, $CEG^b$, $CEH^b$, $CEI^b$, $CEJ^b$, $CFG^b$, $CFH^b$, $CFI^b$, $CFJ^b$, $CGH^b$, $CGI^b$, $CGJ^b$, $CHI^b$, $CHJ^b$, $CIJ^b$; $DEF^b$, $DEG^b$, $DEH^b$, $DEI^b$, $DEJ^b$, $DFG^b$, $DFH^b$, $DFI^b$, $DFJ^b$, $DGH^b$, $DGI^b$, $DGJ^b$, $DHI^b$, $DHJ^b$, $DIJ^b$; $EFG^b$, $EFH^b$, $EFI^b$, $EFJ^b$, $EGH^b$, $EGI^b$, $EGJ^b$, $EHI^b$, $EHJ^b$, $EIJ^b$; $FGH^b$, $FGI^b$, $FGJ^b$, $FHI^b$, $FHJ^b$, $FIJ^b$; $GHI^b$, $GHJ^b$, $GIJ^b$, $HIJ^b$; $ABC^c$, $ABD^c$, $ABE^c$, $ABF^c$, $ABG^c$, $ABH^c$, $ABI^c$, $ABJ^c$, $ACD^c$, $ACE^c$, $ACF^c$, $ACG^c$, $ACH^c$, $ACI^c$, $ACJ^c$, $ADE^c$, $ADF^c$, $ADG^c$, $ADH^c$, $ADI^c$, $ADJ^c$, $AEF^c$, $AEG^c$, $AEH^c$, $AEI^c$, $AEJ^c$, $AFG^c$, $AFH^c$, $AFI^c$, $AFJ^c$, $AGH^c$, $AGI^c$, $AGJ^c$, AHI$^c$, AHJ$^c$, AIJ$^c$; BCD$^c$, BCE$^c$, BCF$^c$, BCG$^c$, BCH$^c$, BCI$^c$, BCJ$^c$, BDE$^c$, BDF$^c$, BDG$^c$, BDH$^c$, BDI$^c$, BDJ$^c$, BEF$^c$, BEG$^c$, BEH$^c$, BEI$^c$, BEJ$^c$, BFG$^c$, BFH$^c$, BFI$^c$, BFJ$^c$, BGH$^c$, BGI$^c$, BGJ$^c$, BHI$^c$, BHJ$^c$, BIJ$^c$; CDE$^c$, CDF$^c$, CDG$^c$, CDH$^c$, CDI$^c$, CDJ$^c$, CEF$^c$, CEG$^c$, CEH$^c$, CEI$^c$, CEJ$^c$, CFG$^c$, CFH$^c$, CFI$^c$, CFJ$^c$, CGH$^c$, CGI$^c$, CGJ$^c$, CHI$^c$, CHJ$^c$, CIJ$^c$; DEF$^c$, DEG$^c$, DEH$^c$, DEI$^c$, DEJ$^c$, DFG$^c$, DFH$^c$, DFI$^c$, DFJ$^c$, DGH$^c$, DGI$^c$, DGJ$^c$, DHI$^c$, DHJ$^c$, DIJ$^c$; EFG$^c$, EFH$^c$, EFI$^c$, EFJ$^c$, EGH$^c$, EGI$^c$, EGJ$^c$, EHI$^c$, EHJ$^c$, EIJ$^c$; FGH$^c$, FGI$^c$, FGJ$^c$, FHI$^c$, FHJ$^c$, FIJ$^c$; GHI$^c$, GHJ$^c$, GIJ$^c$, HIJ$^c$; ABC$^d$, ABD$^d$, ABE$^d$, ABF$^d$, ABG$^d$, ABH$^d$, ABI$^d$, ABJ$^d$, ACD$^d$, ACE$^d$, ACF$^d$, ACG$^d$, ACH$^d$, ACI$^d$, ACJ$^d$, ADE$^d$, ADF$^d$, ADG$^d$, ADH$^d$, ADI$^d$, ADJ$^d$, AEF$^d$, AEG$^d$, AEH$^d$, AEI$^d$, AEJ$^d$, AFG$^d$, AFH$^d$, AFI$^d$, AFJ$^d$, AGH$^d$, AGI$^d$, AGJ$^d$, AHI$^d$, AHJ$^d$, AIJ$^d$; BCD$^d$, BCE$^d$, BCF$^d$, BCG$^d$, BCH$^d$, BCI$^d$, BCJ$^d$, BDE$^d$, BDF$^d$, BDG$^d$, BDH$^d$, BDI$^d$, BDJ$^d$, BEF$^d$, BEG$^d$, BEH$^d$, BEI$^d$, BEJ$^d$, BFG$^d$, BFH$^d$, BFI$^d$, BFJ$^d$, BGH$^d$, BGI$^d$, BGJ$^d$, BHI$^d$, BHJ$^d$, BIJ$^d$; CDE$^d$, CDF$^d$, CDG$^d$, CDH$^d$, CDI$^d$, CDJ$^d$, CEF$^d$, CEG$^d$, CEH$^d$, CEI$^d$, CEJ$^d$, CFG$^d$, CFH$^d$, CFI$^d$, CFJ$^d$, CGH$^d$, CGI$^d$, CGJ$^d$, CHI$^d$, CHJ$^d$, CIJ$^d$; DEF$^d$, DEG$^d$, DEH$^d$, DEI$^d$, DEJ$^d$, DFG$^d$, DFH$^d$, DFI$^d$, DFJ$^d$, DGH$^d$, DGI$^d$, DGJ$^d$, DHI$^d$, DHJ$^d$, DIJ$^d$; EFG$^d$, EFH$^d$, EFI$^d$, EFJ$^d$, EGH$^d$, EGI$^d$, EGJ$^d$, EHI$^d$, EHJ$^d$, EIJ$^d$; FGH$^d$, FGI$^d$, FGJ$^d$, FHI$^d$, FHJ$^d$, FIJ$^d$; GHI$^d$, GHJ$^d$, GIJ$^d$, HIJ$^d$; ABC$^e$, ABD$^e$, ABE$^e$, ABF$^e$, ABG$^e$, ABH$^e$, ABI$^e$, ABJ$^e$, ACD$^e$, ACE$^e$, ACF$^e$, ACG$^e$, ACH$^e$, ACI$^e$, ACJ$^e$, ADE$^e$, ADF$^e$, ADG$^e$, ADH$^e$, ADI$^e$, ADJ$^e$, AEF$^e$, AEG$^e$, AEH$^e$, AEI$^e$, AEJ$^e$, AFG$^e$, AFH$^e$, AFI$^e$, AFJ$^e$, AGH$^e$, AGI$^e$, AGJ$^e$, AHI$^e$, AHJ$^e$, AIJ$^e$; BCD$^e$, BCE$^e$, BCF$^e$, BCG$^e$, BCH$^e$, BCI$^e$, BCJ$^e$, BDE$^e$, BDF$^e$, BDG$^e$, BDH$^e$, BDI$^e$, BDJ$^e$, BEF$^e$, BEG$^e$, BEH$^e$, BEI$^e$, BEJ$^e$, BFG$^e$, BFH$^e$, BFI$^e$, BFJ$^e$, BGH$^e$, BGI$^e$, BGJ$^e$, BHI$^e$, BHJ$^e$, BIJ$^e$; CDE$^e$, CDF$^e$, CDG$^e$, CDH$^e$, CDI$^e$, CDJ$^e$, CEF$^e$, CEG$^e$, CEH$^e$, CEI$^e$, CEJ$^e$, CFG$^e$, CFH$^e$, CFI$^e$, CFJ$^e$, CGH$^e$, CGI$^e$, CGJ$^e$, CHI$^e$, CHJ$^e$, CIJ$^e$; DEF$^e$, DEG$^e$, DEH$^e$, DEI$^e$, DEJ$^e$, DFG$^e$, DFH$^e$, DFI$^e$, DFJ$^e$, DGH$^e$, DGI$^e$, DGJ$^e$, DHI$^e$, DHJ$^e$, DIJ$^e$; EFG$^e$, EFH$^e$, EFI$^e$, EFJ$^e$, EGH$^e$, EGI$^e$, EGJ$^e$, EHI$^e$, EHJ$^e$, EIJ$^e$; FGH$^e$, FGI$^e$, FGJ$^e$, FHI$^e$, FHJ$^e$, FIJ$^e$; GHI$^e$, GHJ$^e$, GIJ$^e$, HIJ$^e$; ABC$^f$, ABD$^f$, ABE$^f$, ABF$^f$, ABG$^f$, ABH$^f$, ABI$^f$, ABJ$^f$, ACD$^f$, ACE$^f$, ACF$^f$, ACG$^f$, ACH$^f$, ACI$^f$, ACJ$^f$, ADE$^f$, ADF$^f$, ADG$^f$, ADH$^f$, ADI$^f$, ADJ$^f$, AEF$^f$, AEG$^f$, AEH$^f$, AEI$^f$, AEJ$^f$, AFG$^f$, AFH$^f$, AFI$^f$, AFJ$^f$, AGH$^f$, AGI$^f$, AGJ$^f$, AHI$^f$, AHJ$^f$, AIJ$^f$; BCD$^f$, BCE$^f$, BCF$^f$, BCG$^f$, BCH$^f$, BCI$^f$, BCJ$^f$, BDE$^f$, BDF$^f$, BDG$^f$, BDH$^f$, BDI$^f$, BDJ$^f$, BEF$^f$, BEG$^f$, BEH$^f$, BEI$^f$, BEJ$^f$, BFG$^f$, BFH$^f$, BFI$^f$, BFJ$^f$, BGH$^f$, BGI$^f$, BGJ$^f$, BHI$^f$, BHJ$^f$, BIJ$^f$; CDE$^f$, CDF$^f$, CDG$^f$, CDH$^f$, CDI$^f$, CDJ$^f$, CEF$^f$, CEG$^f$, CEH$^f$, CEI$^f$, CEJ$^f$, CFG$^f$, CFH$^f$, CFI$^f$, CFJ$^f$, CGH$^f$, CGI$^f$, CGJ$^f$, CHI$^f$, CHJ$^f$, CIJ$^f$; DEF$^f$, DEG$^f$, DEH$^f$, DEI$^f$, DEJ$^f$, DFG$^f$, DFH$^f$, DFI$^f$, DFJ$^f$, DGH$^f$, DGI$^f$, DGJ$^f$, DHI$^f$, DHJ$^f$, DIJ$^f$; EFG$^f$, EFH$^f$, EFI$^f$, EFJ$^f$, EGH$^f$, EGI$^f$, EGJ$^f$, EHI$^f$, EHJ$^f$, EIJ$^f$; FGH$^f$, FGI$^f$, FGJ$^f$, FHI$^f$, FHJ$^f$, FIJ$^f$; GHI$^f$, GHJ$^f$, GIJ$^f$, HIJ$^f$; ABC$^g$, ABD$^g$, ABE$^g$, ABF$^g$, ABG$^g$, ABH$^g$, ABI$^g$, ABJ$^g$, ACD$^g$, ACE$^g$, ACF$^g$, ACG$^g$, ACH$^g$, ACI$^g$, ACJ$^g$, ADE$^g$, ADF$^g$, ADG$^g$, ADH$^g$, ADI$^g$, ADJ$^g$, AEF$^g$, AEG$^g$, AEH$^g$, AEI$^g$, AEJ$^g$, AFG$^g$, AFH$^g$, AFI$^g$, AFJ$^g$, AGH$^g$, AGI$^g$, AGJ$^g$, AHI$^g$, AHJ$^g$, AIJ$^g$; BCD$^g$, BCE$^g$, BCF$^g$, BCG$^g$, BCH$^g$, BCI$^g$, BCJ$^g$, BDE$^9$, BDF$^g$, BDG$^g$, BDH$^g$, BDI$^g$, BDJ$^g$, BEF$^g$, BEG$^g$, BEH$^g$, BEI$^g$, BEJ$^g$, BFG$^g$, BFH$^g$, BFI$^g$, BFJ$^g$, BGH$^g$, BGI$^g$, BGJ$^g$, BHI$^g$, BHJ$^g$, BIJ$^g$; CDE$^g$, CDF$^g$, CDG$^g$, CDH$^g$, CDI$^g$, CDJ$^g$, CEF$^g$, CEG$^g$, CEH$^g$, CEI$^g$, CEJ$^g$, CFG$^g$, CFH$^g$, CFI$^g$, CFJ$^g$, CGH$^g$, CGI$^g$, CGJ$^g$, CHI$^g$, CHJ$^g$, CIJ$^g$; DEF$^g$, DEG$^g$, DEH$^g$, DEI$^g$, DEJ$^g$, DFG$^g$, DFH$^g$, DFI$^g$, DFJ$^g$, DGH$^g$, DGI$^g$, DGJ$^g$, DHI$^g$, DHJ$^g$, DIJ$^g$; EFG$^g$, EFH$^g$, EFI$^g$, EFJ$^g$, EGH$^g$, EGI$^g$, EGJ$^g$, EHI$^g$, EHJ$^g$, EIJ$^g$; FGH$^g$, FGI$^g$, FGJ$^g$, FHI$^g$, FHJ$^g$, FIJ$^g$; GHI$^g$, GHJ$^g$, GIJ$^g$, HIJ$^g$; ABC$^h$, ABD$^h$, ABE$^h$, ABF$^h$, ABG$^h$, ABH$^h$, ABI$^h$, ABJ$^h$, ACD$^h$, ACE$^h$, ACF$^h$, ACG$^h$, ACH$^h$, ACI$^h$, ACJ$^h$, ADE$^h$, ADF$^h$, ADG$^h$, ADH$^h$, ADI$^h$, ADJ$^h$, AEF$^h$, AEG$^h$, AEH$^h$, AEI$^h$, AEJ$^h$, AFG$^h$, AFH$^h$, AFI$^h$, AFJ$^h$, AGH$^h$, AGI$^h$, AGJ$^h$, AHI$^h$, AHJ$^h$, AIJ$^h$; BCD$^h$, BCE$^h$, BCF$^h$, BCG$^h$, BCH$^h$, BCI$^h$, BCJ$^h$, BDE$^h$, BDF$^h$, BDG$^h$, BDH$^h$, BDI$^h$, BDJ$^h$, BEF$^h$, BEG$^h$, BEH$^h$, BEI$^h$, BEJ$^h$, BFG$^h$, BFH$^h$, BFI$^h$, BFJ$^h$, BGH$^h$, BGI$^h$, BGJ$^h$, BHI$^h$, BHJ$^h$, BIJ$^h$; CDE$^h$, CDF$^h$, CDG$^h$, CDH$^h$, CDI$^h$, CDJ$^h$, CEF$^h$, CEG$^h$, CEH$^h$, CEI$^h$, CEJ$^h$, CFG$^h$, CFH$^h$, CFI$^h$, CFJ$^h$, CGH$^h$, CGI$^h$, CGJ$^h$, CHI$^h$, CHJ$^h$, CIJ$^h$; DEF$^h$, DEG$^h$, DEH$^h$, DEI$^h$, DEJ$^h$, DFG$^h$, DFH$^h$, DFI$^h$, DFJ$^h$, DGH$^h$, DGI$^h$, DGJ$^h$, DHI$^h$, DHJ$^h$, DIJ$^h$; EFG$^h$, EFH$^h$, EFI$^h$, EFJ$^h$, EGH$^h$, EGI$^h$, EGJ$^h$, EHI$^h$, EHJ$^h$, EIJ$^h$; FGH$^h$, FGI$^h$, FGJ$^h$, FHI$^h$, FHJ$^h$, FIJ$^h$; GHI$^h$, GHJ$^h$, GIJ$^h$, HIJ$^h$; ABC$^i$, ABD$^i$, ABE$^i$, ABF$^i$, ABG$^i$, ABH$^i$, ABI$^i$, ABJ$^i$, ACD$^i$, ACE$^i$, ACF$^i$, ACG$^i$, ACH$^i$, ACI$^i$, ACJ$^i$, ADE$^i$, ADF$^i$, ADG$^i$, ADH$^i$, ADI$^i$, ADJ$^i$, AEF$^i$, AEG$^i$, AEH$^i$, AEI$^i$, AEJ$^i$, AFG$^i$, AFH$^i$, AFI$^i$, AFJ$^i$, AGH$^i$, AGI$^i$, AGJ$^i$, AHI$^i$, AHJ$^i$, AIJ$^i$; BCD$^i$, BCE$^i$, BCF$^i$, BCG$^i$, BCH$^i$, BCI$^i$, BCJ$^i$, BDE$^i$, BDF$^i$, BDG$^i$, BDH$^i$, BDI$^i$, BDJ$^i$, BEF$^i$, BEG$^i$, BEH$^i$, BEI$^i$, BEJ$^i$, BFG$^i$, BFH$^i$, BFI$^i$, BFJ$^i$, BGH$^i$, BGI$^i$, BGJ$^i$, BHI$^i$, BHJ$^i$, BIJ$^i$; CDE$^i$, CDF$^i$, CDG$^i$, CDH$^i$, CDI$^i$, CDJ$^i$, CEF$^i$, CEG$^i$, CEH$^i$, CEI$^i$, CEJ$^i$, CFG$^i$, CFH$^i$, CFI$^i$, CFJ$^i$, CGH$^i$, CGI$^i$, CGJ$^i$, CHI$^i$, CHJ$^i$, CIJ$^i$; DEF$^i$, DEG$^i$, DEH$^i$, DEI$^i$, DEJ$^i$, DFG$^i$, DFH$^i$, DFI$^i$, DFJ$^i$, DGH$^i$, DGI$^i$, DGJ$^i$, DHI$^i$, DHJ$^i$, DIJ$^i$; EFG$^i$, EFH$^i$, EFI$^i$, EFJ$^i$, EGH$^i$, EGI$^i$, EGJ$^i$, EHI$^i$, EHJ$^i$, EIJ$^i$; FGH$^i$, FGI$^i$, FGJ$^i$, FHI$^i$, FHJ$^i$, FIJ$^i$; GHI$^i$, GHJ$^i$, GIJ$^i$, and HIJ$^i$; wherein in each case the abbreviations A, B, C, D, E, F, G, H, I, J as well as $^a$, $^b$, $^c$, $^d$, $^e$, $^f$, $^g$, $^h$, and $^i$ have the above meaning. For example, the embodiment abbreviated as "AGH$^f$" refers to a combination of ascorbic acid (first named organic acid A) with malonic acid (second named organic acid G) and with oxalic acid (third named organic acid H), wherein the relative weight ratio of ascorbic acid to malonic acid to oxalic acid is within the range of about (15±5):(75±25):(10±3) (weight ratio $^f$).

In a preferred embodiment, the polymer composition according to the invention—besides the organic acid component—does not contain any other blowing agent. Examples of such blowing agents which are preferably not contained include chemical blowing agents (e.g., those agents that provide for material expansion via a chemical reaction) including but not limited to azodicarbonamide, dinitroso-pentamethylenetetramine, hydrazides such as 4,4-oxy-bis-(benzenesulphonylhydrazide), trihydrazino-triazine, N,N'-dimethyl-N,N'-dinitrosoterephthalamide, toluenesulfonyl hydrazide (TSH), p-toluenesulfonyl semicarbazide (TSSC), 5-phenyl tetrazole (5-PT), or N—N'-dinitrosopentamethylene tetramine (DNPT). Examples of such blowing agents which are preferably not contained include physical blowing agent, wherein material expansion occurs via a phase change mechanism. Physical blowing agents like Expancel, sold by Akzo Nobel, Sundsvall, Sweden, comprise a volatile liquid trapped in a thermoplastic shell. When they are heated, the shell softens and the liquid boils. This is the physical transformation (from a liquid to a gas) that gives this type of blowing agent its name. When the volatile liquid becomes a gas it causes the softened shell to stretch/expand. The gas is generated but it is not released from the shell.

In another preferred embodiment, the polymer composition according to the invention—besides the organic acid component—does not contain any other chemical blowing agent as defined above, but may additionally comprise a physical blowing agent as defined above. Under these circumstances, the released gas that causes volume expansion may either essentially consist of carbon dioxide that is released from the organic acid component as well as from the physical blowing agent, or may comprise a gas mixture of carbon dioxide that is released from the organic acid component and another gas (volatile liquid) differing from carbon dioxide that is released from the physical blowing agent.

Preferably, the polymer composition according to the invention—besides the organic acid component—does not contain a tertiary alkyl carbamate as blowing agent such as described in WO 2016/097365.

Preferably, the polymer composition according to the invention—besides the organic acid component—does not contain a mixture of citric acid with sodium hydrogen carbonate as blowing agent such as described in WO2015/140282.

Preferably, the polymer composition according to the invention comprises neither sodium carbonate nor sodium hydrogencarbonate (sodium bicarbonate), more preferably neither ammonium carbonate, nor an alkali metal carbonate, nor an alkali metal hydrogencarbonate, still more preferably neither any carbonate salt nor any hydrogencarbonate salt. Preferably, the polymer composition according to the invention comprises no ammonium salts selected from the group consisting of ammonium hydrogen carbonate, ammonium chloride, ammonium carbonate and the like.

Preferably, the polymer composition according to the invention comprises besides the organic acid component no other component, which other component, when being heated to the activation of expansion temperature, releases a gas comprising carbon dioxide. More preferably, the polymer composition according to the invention comprises besides the organic acid component no other component, which other component, when being heated to the activation of expansion temperature, releases any gas.

The composition according to the invention preferably comprises neither salts of formic acid such as zinc formiate, cadmium formiate, lead formiate, nickel formiate, and the like, nor salts of oxalic acid such as beryllium oxalate, magnesium oxalate, strontium oxalate, lead oxalate, zinc oxalate, nickel oxalate, cobalt oxalate, cadmium oxalate, and the like.

In a preferred embodiment, the polymer composition according to the invention is dry to the touch and/or non-tacky to the touch at room temperature (23° C.). Preferably, the polymer composition according to the invention becomes adhesive at elevated temperature. Preferably, when being heated to the activation of expansion temperature, the polymer composition according to the invention exhibits adhesive properties.

In another preferred embodiment, the polymer composition according to the invention is tacky to the touch at room temperature (23° C.).

Preferably, the polymer composition according to the invention is selected from structural adhesives, structural foams, noise reducing foams, cavity fillers and sealants. Depending upon the specific application, the polymer composition may comprise conventional constituents.

Representative structural adhesives and structural foams and their typical constituents are described e.g. in US 2008/0143143, US 2008/0257491, US 2011/0156443, US 2011/0192015, US 2011/0220267, US 2012/0028032, US 2012/0146296, US 2012/0205029, US 2012/0235401, US 2013/0056153, US 2013/0206333, and US 2014/0113983, which are incorporated herein by reference.

Representative noise reducing foams, cavity fillers and sealants and their typical constituents are described e.g. in US 2007/0193171, US 2008/0265516, US 2009/0202294, US 2012/0201627, US 2013/0232896, US 2014/0169861, US 2015/0147472, and US 2015/0158282, which are incorporated herein by reference.

Preferably, the polymer composition according to the invention at the activation of expansion temperature, preferably at 165° C., undergoes volume expansion in a range from about 50 vol.-% up to about 2000 vol.-%, depending upon the application of the polymer composition. For structural adhesives and structural foams, volume expansion is preferably within the range of from about 50 vol.-% to about 200 vol.-%. For noise reducing foams, cavity fillers and sealants, volume expansion is preferably higher, e.g. preferably at least about 200 vol.-%, or at least about 400 vol.-%, or at least about 600 vol.-%, or at least about 800 vol.-%, or at least about 1000 vol.-%, or at least about 1500 vol.-%, or at least about 2000 vol.-%, relative to the volume of the polymer composition before it was heated to the activation of expansion temperature. Subject to preliminary routine experiments, the volume expansion of the polymer composition can be adjusted by the type and amount of the blowing component.

Preferably, the polymer composition according to the invention has an activation of expansion temperature of at least about 100° C., more preferably at least about 120° C., still more preferably at least about 140° C. Preferably, the activation of expansion temperature is below 250° C. Preferably, the activation of expansion temperature is within the range of temperatures experienced in the automotive anticorrosion coating bake oven. Typically, activation of expansion temperatures are in the range of from about 150° C. to about 220° C. Therefore, very high temperatures at which the polymer composition would undergo pyrolysis, e.g. 600° C. or 1200° C., are not to be regarded as activation of expansion temperature within the meaning according to the invention.

Likewise, when the polymer composition according to the invention is curable, it preferably has an activation of cure temperature of at least about 100° C., more preferably at least about 120° C., still more preferably at least about 140° C. Preferably, the activation of cure temperature is below 250° C. Preferably, the activation of cure temperature is within the range of temperatures experienced in the automotive anticorrosion coating bake oven. Typically, activation of cure temperatures are in the range of from about 150° C. to about 220° C. Therefore, very high temperatures at which the polymer composition would undergo pyrolysis, e.g. 600° C. or 1200° C., are not to be regarded as activation of cure temperature within the meaning according to the invention.

The polymer composition according to the invention comprises at least one polymer. A polymer is composed of macromolecules, i.e. molecules of high relative molecular mass, the structure of which essentially comprises the multiple repetition of units derived, actually or conceptually, from molecules of low relative molecular mass.

Preferably, the polymer composition according to the invention comprises a polymer blend, i.e. a mixture of different polymers, which preferably differ from one another in molecular weight, melt flow index, and/or chemical nature, e.g. relative content of comonomer units or chemical nature of monomer units.

The polymer is preferably a curable polymer, i.e. capable of being cured, preferably by cross-linking involving a reaction between the curable polymer and a curing agent. The curing agent may be one or more of the constituents of the organic acid component, i.e. the first organic acid, the second organic acid and/or the one or more optionally present additional organic acids, provided that they are multifunctional organic acids capable of curing the polymer composition, i.e. act as curing agents, and provided that the polymer composition comprises a curable polymer with reactive functional groups such as glycidyl groups that are capable of reacting with the multifunctional organic acids. Preferably, such cross-linking is induced thermally, i.e. preferably the polymer composition already contains all constituents that are necessary for autonomous curing upon heating, such that external inductors other than heat, e.g. actinic radiation, are not necessary.

Suitable polymers, preferably suitable curable polymers, are known to the skilled person and may vary depending upon the intended use of the polymer composition according to the invention, i.e. structural adhesives, structural foams, noise reducing foams, cavity fillers, sealants, and the like. Suitable polymers include but are not limited to epoxy based materials, polyolefins (e.g., polyethylene, polypropylene), polystyrene, polyacrylates, polybutylacrylates, poly(ethylene oxides), poly(ethylene-imines), polyesters, polyurethanes, polysiloxanes, polyethers, polyphosphazines, polyamides, poly-imides, polyisobutylenes, polyacrylonitriles, poly(vinyl chlorides), poly(methyl methacrylates), poly(vinyl acetates), olefin acrylate copolymers, olefin acrylate terpolymers, olefin vinylacetate copolymers, poly(vinylidene chlorides), polytetrafluoroethylenes, polyisoprenes, polyacrylamides, polyacrylic acids, polymethacrylates, their mixtures and/or copolymers.

A skilled person recognizes that curing (cross-linking) of the curable polymer can be achieved by different mechanisms, depending upon the chemical nature of the curable polymer and a compatible curing agent. Curing can be based upon a free radical mechanism, a condensation reaction, an addition reaction, sulfur vulcanization, and the like.

The curing should be induced at a temperature at which the formulation will flow and is preferably induced at temperatures above about 110° C., more preferably at temperatures of at least about 165° C., most preferably at a temperature in the range of from about 130° C. to about 220° C., preferably from about 150° C. to about 220° C. such as the temperatures experienced in the automotive anticorrosion coat (known as e-coat) bake oven.

Preferably, the polymer composition according to the invention comprises a curable polymer (e.g. polyolefin or epoxy based material). Depending upon its application, e.g. as structural adhesive, structural foam, noise reducing foam, cavity filler or sealant, the polymer composition may comprise additional constituents, such as tackifyers, impact modifiers, flexibilizers, fillers, and the like.

When the polymer composition is a noise reducing foam, cavity filler or sealant, the curable polymer preferably comprises a curable polyolefin and the curing agent is one that is capable of reacting with the polyolefin thereby providing a cross-linked polyolefinic resin. According to this embodiment, peroxides may be added as radical initiators optionally together with coagents (curing accelerators) in order to induce radical cross-linking upon activation at elevated temperature. It has been surprisingly found, however, that under certain circumstances, the organic acid component itself may be involved in cross-linking of curable polyolefins upon activation at elevated temperature even in the absence of such radical initiators and coagents for crosslink formation by peroxides. Alternatively, curing of the curable polyolefin may be achieved by any other known curing system such as sulfur curing.

When the polymer composition is a structural adhesive or structural foam, the curable polymer preferably comprises a curable epoxy based material and the curing agent is one that is capable of reacting with the epoxy based material thereby providing a cross-linked epoxy resin. According to this embodiment, the organic acid component itself may principally also act as a curing agent, because epoxy functional groups are capable of reacting with carboxylic acidic functional groups of a multicarboxylic acid, e.g. dicarboxylic acid or tricarboxylic acid, upon activation at elevated temperature. Alternatively or additionally, a curing agent for the epoxy based material such as dicyandiamide may be added to the polymer composition.

Accordingly, depending on the final properties of the polymer composition, the organic acid component can act as a curing agent and as a blowing agent; or the organic acid component can act as a blowing agent whereas curing is achieved by another constituent like sulfur, or peroxide optionally in combination with a coagent, or dicyandiamide.

In a preferred embodiment, particularly when the polymer composition is a noise reducing foam, cavity filler or sealant, the curable polymer comprises a polyolefin, olefin acrylate copolymer, olefin acrylate terpolymer, olefin vinylacetate copolymer, olefin elastomers or mixture thereof, for the purpose of the specification commonly encompassed by and referred to as "polyolefins".

Preferred olefin acrylate copolymers include but are not limited to ethylene alkyl acrylate copolymers and ethylene alkyl methacrylate copolymers, wherein the alkyl group in the alkyl acrylate and the alkyl methacrylate, respectively, is preferably selected from methyl, ethyl, propyl, and butyl. Preferred olefin acrylate copolymers are selected from the group consisting of ethylene methyl acrylate copolymers (E/MA), ethylene ethyl acrylate copolymers (E/EA), ethylene propyl acrylate copolymers (E/PA), ethylene butyl acrylate copolymers (E/BA), ethylene methyl methacrylate copolymers (E/MMA), ethylene ethyl methacrylate copolymers (E/EMA), ethylene propyl methacrylate copolymers (E/PMA), and ethylene butyl methacrylate copolymers (E/BMA); more preferably ethylene methyl acrylate copolymers (E/MA) or ethylene butyl acrylate copolymers (E/BA), whereas in each case the acrylate content is preferably within the range of from about 20 to about 35%.

Preferred olefin acrylate terpolymers are terpolymers of ethylene and alkyl acrylate, or ethylene and alkyl methacrylate, in each case with glycidyl acrylate (GA) or glycidyl methacrylate (GMA), wherein the alkyl group in the alkyl acrylate and the alkyl methacrylate, respectively, is preferably selected from methyl, ethyl, propyl, and butyl. Preferred olefin acrylate terpolymers are selected from the group consisting of ethylene methyl acrylate glycidyl acrylate terpolymers (E/MA/GA), ethylene ethyl acrylate glycidyl acrylate terpolymers (E/EA/GA), ethylene propyl acrylate glycidyl acrylate terpolymers (E/PA/GA), ethylene butyl acrylate glycidyl acrylate terpolymers (E/BA/GA), ethylene methyl methacrylate glycidyl acrylate terpolymers (E/MMA/GA), ethylene ethyl methacrylate glycidyl acrylate terpolymers (E/EMA/GA), ethylene propyl methacrylate glycidyl acrylate terpolymers (E/PMA/GA), ethylene butyl methacrylate glycidyl acrylate terpolymers (E/BMA/GA), ethylene methyl acrylate glycidyl methacrylate terpolymers (E/MA/GMA), ethylene ethyl acrylate glycidyl methacrylate terpolymers (E/EA/GMA), ethylene propyl acrylate glycidyl methacrylate terpolymers (E/PA/GMA), ethylene butyl acrylate glycidyl methacrylate terpolymers (E/BA/GMA), ethylene methyl methacrylate glycidyl methacrylate terpolymers (E/MMA/GMA), ethylene ethyl methacrylate glycidyl methacrylate terpolymers (E/EMA/GMA), ethylene propyl methacrylate glycidyl methacrylate terpolymers (E/PMA/GMA), ethylene butyl methacrylate glycidyl methacrylate terpolymers (E/BMA/GMA); more preferably ethylene methyl acrylate glycidyl methacrylate terpolymers (E/MA/GMA) or ethylene butyl acrylate glycidyl methacrylate terpolymers (E/BA/GMA); whereas in each case the acrylate content is preferably within the range of from about 20 to about 35%.

The additional reactive functional glycidyl groups in the olefin acrylate terpolymers (E/MA/GMA, E/BA/GMA, etc.) are interesting because of advantages they provide that do not need to be directly related to the curing of the polymer. For example, the additional reactive functional glycidyl groups may help with adhesion to oily metal surfaces. It has been found that the additional reactive functional glycidyl groups may react with multifunctional organic acids of the organic acid component thereby curing the polymer composition.

Preferred olefin vinylacetate copolymers include but are not limited to ethylene vinyl acetate copolymers (ENA), which may be optionally grafted with maleic anhydride (MAH), i.e. ENA/MAH.

Preferably, the content of the curable polymer is within the range of from about 40 to 75 wt.-%, relative to the total weight of the polymer composition.

In a preferred embodiment, the overall content of the olefin acrylate copolymer (e.g. E/MA and/or E/BA) is within the range of from about 15 to about 25 wt.-%, the content of the olefin vinylacetate copolymer (e.g. ENA) is within the range of from about 15 to about 25 wt.-%, and the content of optionally present olefin acrylate terpolymer (e.g. E/MA/GMA and/or E/BA/GMA) is within the range of from about 0 to about 20 wt.-%, preferably about 0 to about 10 wt.-%, in each case relative to the total weight of the polymer composition.

In another preferred embodiment, the overall content of the olefin acrylate copolymer (e.g. E/MA and/or E/BA) is within the range of from about 15 to about 30 wt.-%, the content of the olefin vinylacetate copolymer (e.g. ENA) is within the range of from about 15 to about 35 wt.-%, and the content of optionally present grafted olefin vinylacetate copolymer (ENA/MAH) is within the range of from about 0 to about 10 wt.-%, in each case relative to the total weight of the polymer composition.

As far as the above polyolefins, olefin acrylate copolymers, olefin acrylate terpolymers, olefin vinylacetate copolymers, olefin elastomers or mixtures thereof are concerned, the polymer composition may comprise a curing agent. There are two main curing systems for polyolefins, e.g. for ethylene copolymers, namely sulfur curing systems and peroxides curing systems. Sulfur cure is typically limited to polyolefins with carbon-to-carbon double bonds, like ethylene propylene diene monomer rubber (EPDM). Peroxide can typically cure polyolefins with or without carbon-to-carbon double bonds, like ethylene vinyl acetate copolymers (EVA). Peroxide cured polyolefins are typically stronger, more durable, and more expensive than sulfur cured polyolefins. Peroxide cured foams are predominantly closed-celled (when compressed, the cells of the foam deform). Sulfur cured foams are predominantly open-celled (when compressed, the gas flows out of the cells). So peroxide cured foams tend to absorb less water, another advantage for most automotive applications.

In a preferred embodiment, the polymer composition according to the invention comprises a curable polymer, preferably a curable polyolefin, and a curing agent which includes one or more peroxides, optionally in combination with one or more coagents for crosslink formation by peroxides (curing accelerators). Under these circumstances, curing relies on a free radical mechanism. Deciding which system is optimal for a given application depends on the required curing conditions, the polymer or polymer blend employed, and the desired physical properties of the finally cured polymer composition.

Suitable peroxides according to the invention preferably have cure temperatures in the range of from about 120° C. to about 220° C., preferably from about 150° C. to about 200° C., i.e. in the range of the activation of cure temperature according to the invention. Preferred peroxides include but are not limited to dibenzoyl peroxide, 2,5-dimethyl-2,5-bis(tert-butyl peroxy) hexane, 2,5-dimethyl-2,5-bis(tert-butyl peroxy) hexyne-3, di-tert-butyl peroxide, tert-butyl cumyl peroxide, dicumyl peroxide, bis(tert-butyl peroxy isopropyl)benzene, 4,4-di-tert-butyl peroxy N-butyl valerate, and 1,1-di-tert-butyl peroxy-3,3,5-trimethylcyclohexane.

The basic chemistry of peroxide decomposition and subsequent crosslink-forming reactions is well established for the various unsaturated and saturated polymer systems and typically include desirable reactions which lead to effective crosslink formation and undesirable, competing reactions which detract from productive use of radicals. The balance between productive and competing nonproductive reactions depends on many factors and according to the invention may be tipped toward productive crosslink formation through the use of coagents for crosslink formation by peroxides, i.e. very reactive, multifunctional coagent compounds. Coagents for crosslink formation by peroxides preferably favor network formation through increased local concentrations of easily-abstractable hydrogens, e.g. allylic hydrogens, or other very reactive sites of unsaturation.

Preferred coagents for crosslink formation by peroxides include but are not limited to
(i) multifunctional acrylate and methacrylate esters, such as ethylene glycol diacrylate, ethylene glycol dimethacrylate, 1,3-butylene glycol dimethacrylate, diallyl maleate, allyl methacrylate, trimethylolpropane dimethacrylate, trimethylolpropane triacrylate, trimethylolpropane trimeth-acrylate, octyl/decyl acrylate, 1,6-hexanediol diacrylate, pentaerythritol tetraacrylate, or dipenta-erythritol pentaacrylate; and
(ii) allyl containing cyanurates and isocyanurates, such as triallyl cyanurate or triallyl isocyanurate.

Polymers that are curable by means of the above one or more peroxides, optionally in combination with one or more of the above coagents for crosslink formation by peroxides, are known to the skilled person and include but are not limited to
polyolefins, olefin acrylate copolymers, olefin acrylate terpolymers, olefin vinylacetate copolymers or mixtures thereof;
polyolefin elastomers and other elastomers such as natural rubber, polyisoprene, polybutadiene copolymers, styrene butadiene rubber, acrylonitrile butadiene rubber, hydrogenated butadiene acrylonitrile rubber, polychloroprene, polyurethane, hypalon, chlorinated polyethylene, ethylene-propylene co- and terpolymers, silicone, bromobutyl rubber, fluor rubber, and polyethylene.

In another preferred embodiment, the polymer composition according to the invention besides the organic acid component neither contains any peroxides as defined above nor any coagent for crosslink formation by peroxide as defined above.

Depending upon the nature of the curable polymer that is contained in the polymer composition according to the invention, the organic acid component may act as a curing agent. When the organic acid component itself acts as a curing agent, it is preferably covalently involved in the cross-linking of one polymer chain to another polymer chain. It has been found that curable polymers, preferably curable polyolefins, with reactive functional groups such as glycidyl groups are capable of reacting with multifunctional organic acids at elevated temperature (activation of cure temperature) thereby curing the polymer composition. Under these circumstances, depending upon the nature of the reactive functional groups, curing relies on a condensation reaction or addition reaction.

It has been surprisingly found that satisfactory degrees of curing can already be achieved with curable polymers, preferably curable polyolefins, having a comparatively low content of such reactive functional groups. For example, a polymer composition containing 6 wt.-% of an olefinic copolymer, relative to the total weight of the polymer composition, wherein said olefinic copolymer contains 8 wt.-% of glycidyl methacrylate repetition units, relative to the total weight of all repetition units of said olefinic copolymer (total weight of copolymer), provides satisfactory curing upon reaction with a multifunctional organic acid at a content of 15 wt.-%, relative to the total weight of the polymer composition.

Preferably, the polymer composition comprises a curable polymer, preferably a curable polyolefin, wherein the curable polymer comprises repetition units that contain reactive functional groups which—at elevated temperature—are capable of reacting with multifunctional organic acids, preferably with multifunctional carboxylic acids, wherein the repetition units are preferably derived from glycidyl acrylate and/or glycidyl methacrylate, and wherein the weight content of said repetition units, relative to the total weight of the polymer composition, is at least about 0.01 wt.-%, more preferably at least about 0.05 wt.-%, still more preferably at least about 0.1 wt.-%; and/or at most about 10 wt.-%, more preferably about 5.0 wt.-%, still more preferably at most about 2.5 wt.-%, still more preferably at most about 1.0 wt.-%; and/or within the range of about 0.20±0.15, or about 0.25±0.20, or about 0.30±0.25, or about 0.35±0.30, or about 0.40±0.35, or about 0.45±0.40, or about 0.50±0.45, or about 0.55±0.50, or about 0.60±0.55, or about 0.65±0.60, or about 0.70±0.65, or about 0.75±0.70, or about 0.80±0.75, or about 0.85±0.80, or about 0.90±0.85, or about 0.95±0.90, or about 1.00±0.95.

According to the invention, the following three preferred embodiments (among others) can be distinguished with respect to the curing mechanism finally providing a cured polymer composition, provided that the organic acid component comprises at least one multifunctional organic acid:

(i) the polymer composition comprises a curable polymer, preferably a polyolefin, with reactive functional groups (e.g. glycidyl groups) that are capable of reacting with the at least one multifunctional organic acid at elevated temperature; but the polymer composition comprises neither a peroxide as defined above nor a coagent for crosslink formation by peroxide as defined above; under these circumstances, curing essentially relies upon the reaction of the at least one multifunctional organic acid with the reactive functional groups of the curable polymer (=curing mechanism "acid only");

(ii) the polymer composition comprises a curable polymer, preferably a polyolefin, with reactive functional groups (e.g. glycidyl groups) that are capable of reacting with the at least one multifunctional organic acid at elevated temperature; and additionally the polymer composition comprises a peroxide as defined above, optionally in combination with a coagent for crosslink formation by peroxide as defined above; under these circumstances, curing essentially relies upon the reaction of the at least one multifunctional organic acid with the reactive functional groups of the curable polymer as well as upon the crosslink formation that is induced by the peroxide and the optionally present coagent for crosslink formation by peroxide (=curing mechanism "acid and peroxide/coagent"); or (iii) the polymer composition comprises a curable polymer, preferably a polyolefin, without reactive functional groups (e.g. glycidyl groups) that are capable of reacting with the at least one multifunctional organic acid at elevated temperature, but the polymer composition comprises a peroxide as defined above, optionally in combination with a coagent for crosslink formation by peroxide as defined above; under these circumstances, curing essentially relies upon the crosslink formation that is induced by the peroxide and the optionally present coagent (=curing mechanism "peroxide/coagent only").

The polymer composition may include one or more tackifiers (e.g., tackifying resins), which may be added to the composition for enhancing adhesion, peel strength or both. The tackifier may be a hydrocarbon based tackifier such as an aromatically modified C5 or C5:C9 hydrocarbon tackifying resin or an aliphatic resin. When included, the tackifying resin is up to about 25 wt.-% of the composition. The tackifier may comprise from about 2 wt.-% to about 20 wt.-%, preferably from about 10 wt.-% to about 20 wt.-% of the composition. Exemplary tackifiers are sold under the tradename WINGTACK, commercially available from Goodyear Chemical, or under the tradename Escorez® 5690, commercially available from Exxon Mobil Corporation.

The polymer composition may also include one or more fillers, including but not limited to particulated materials (e.g., powder), beads, microspheres, or the like. Fillers can be useful to reduce any blocking tendency of the uncured polymer composition, reduce cost, and reduce the coefficient of thermal expansion of the cured material. The precursor layer may include a filler that comprises less than about 25 wt.-% of the precursor material. Ideally, the filler may comprise less than about 2.5 wt.-% of the precursor layer. Any filler present may include a material that is generally non-reactive with the other components present in the precursor layer.

Examples of suitable fillers include calcium carbonate, silica, diatomaceous earth, glass, clay (e.g., including nanoclay), talc, pigments, colorants, glass beads or bubbles, glass, carbon or ceramic fibers, nylon aramid or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one embodiment it is preferred to include a thixotropic filler such as aramid fiber or certain clays in the polymer composition. The inclusion of such a thixotropic filler can reduce the tendency of the polymer composition to flow and sag when it is a fluid state such as when it is heated to the activation of expansion temperature and activation of cure temperature, respectively.

In a particularly preferred embodiment of the invention, particularly when the polymer composition is a noise reducing foam, cavity filler or sealant, the polymer composition comprises or essentially consists of
an organic acid component as defined above;
an olefin acrylate copolymer as defined above, preferably selected from (E/MA), (E/EA), (E/PA), (E/BA), (E/MMA), (E/EMA), (E/PMA), (E/BMA), and mixtures thereof;
optionally, an olefin acrylate terpolymer as defined above, preferably selected from (E/MA/GA), (E/EA/GA), (E/PA/GA), (E/BA/GA), (E/MMA/GA), (E/EMA/GA), (E/PMA/GA), (E/BMA/GA), (E/MA/GMA), (E/EA/GMA), (E/PA/GMA), (E/BA/GMA), (E/MMA/GMA), (E/EMA/GMA), (E/PMA/GMA), (E/BMA/GMA), and mixtures thereof;
an olefin vinylacetate copolymer as defined above, preferably selected from (ENA), (ENA/MAH), and mixtures thereof;
optionally, a tackifyer, preferably an aliphatic tackifying resin; and
optionally, one or more fillers.

According to one preferred alternative of this particularly preferred embodiment of the invention (curing mechanism "acid+peroxide/coagent"), the polymer composition comprises or essentially consists of
an organic acid component as defined above;
an olefin acrylate copolymer as defined above, preferably selected from (E/MA), (E/EA), (E/PA), (E/BA), (E/MMA), (E/EMA), (E/PMA), (E/BMA), and mixtures thereof;
an olefin acrylate terpolymer as defined above, preferably selected from (E/MA/GA), (E/EA/GA), (E/PA/GA), (E/BA/GA), (E/MMA/GA), (E/EMA/GA), (E/PMA/GA), (E/BMA/GA), (E/MA/GMA), (E/EA/GMA), (E/PA/GMA), (E/BA/GMA), (E/MMA/GMA), (E/EMA/GMA), (E/PMA/GMA), (E/BMA/GMA), and mixtures thereof;
an olefin vinylacetate copolymer as defined above, preferably selected from (E/VA), (E/VA/MAH), and mixtures thereof;
a peroxide, optionally together with a coagent for crosslink formation by peroxide as defined above;
optionally, a tackifyer, preferably an aliphatic tackifying resin; and
optionally, one or more fillers.

According to another preferred alternative of this particularly preferred embodiment of the invention (curing mechanism "acid only"), the polymer composition comprises or essentially consists of
an organic acid component as defined above;
an olefin acrylate copolymer as defined above, preferably selected from (E/MA), (E/EA), (E/PA), (E/BA), (E/MMA), (E/EMA), (E/PMA), (E/BMA), and mixtures thereof;
an olefin acrylate terpolymer as defined above, preferably selected from (E/MA/GA), (E/EA/GA), (E/PA/GA), (E/BA/GA), (E/MMA/GA), (E/EMA/GA), (E/PMA/GA), (E/BMA/GA), (E/MA/GMA), (E/EA/GMA), (E/PA/GMA), (E/BA/GMA), (E/MMA/GMA), (E/EMA/GMA), (E/PMA/GMA), (E/BMA/GMA), and mixtures thereof;
an olefin vinylacetate copolymer as defined above, preferably selected from (E/VA), (E/VA/MAH), and mixtures thereof;
optionally, a tackifyer, preferably an aliphatic tackifying resin; and
optionally, one or more fillers;
but neither a peroxide as defined above nor a coagent for crosslink formation by peroxide as defined above.

According to still another preferred alternative of this particularly preferred embodiment of the invention (curing mechanism "peroxide/coagent only"), the polymer composition comprises or essentially consists of
an organic acid component as defined above;
an olefin acrylate copolymer as defined above, preferably selected from (E/MA), (E/EA), (E/PA), (E/BA), (E/MMA), (E/EMA), (E/PMA), (E/BMA), and mixtures thereof;
an olefin vinylacetate copolymer as defined above, preferably selected from (E/VA), (E/VA/MAH), and mixtures thereof;
a peroxide, optionally together with a coagent for crosslink formation by peroxide as defined above;
optionally, a tackifyer, preferably an aliphatic tackifying resin; and
optionally, one or more fillers;
but no olefin acrylate terpolymer as defined above.

In another preferred embodiment, particularly when the polymer composition is a structural adhesive or a structural foam, the curable polymer preferably comprises an epoxy based material, i.e. a material that comprises reactive epoxy functional groups. The polymer composition includes the epoxy based material in order to form a desirable polymer composition that can later be activated to cure (for the purpose of the specification also abbreviated as "epoxy").

The epoxy based material may be any dimeric, oligomeric or polymeric epoxy materials containing at least one epoxy functional group, i.e. a reactive oxirane moiety. Moreover, the term epoxy based material can be used to denote one epoxy based material or a combination of multiple epoxy based materials. The epoxy-based materials may be epoxy-containing materials having one or more oxirane rings polymerizable by a ring opening reaction.

The polymer composition may include up to about 80 wt.-% or more of an epoxy based material, preferably between about 2 wt.-% and about 70 wt.-% epoxy based material, between about 4 wt.-% and about 30 wt.-% epoxy based material, or even between about 7 wt.-% and about 18 wt.-% epoxy based material. Preferably, the content of the epoxy based material is at most about 80 wt.-%, relative to the total weight of the polymer composition. Preferably, the content of the epoxy based material is at least about 2 wt.-%, relative to the total weight of the polymer composition.

When the polymer composition according to the invention comprises more than a single epoxy based material, e.g. a combination of a liquid epoxy based material with a solid epoxy based material, the above contents preferably apply to the overall (total) content of epoxy based materials, relative to the total weight of the polymer composition.

The epoxy based material may be aliphatic, cycloaliphatic, aromatic or the like.

The epoxy based material may include an ethylene copolymer or terpolymer that may possess an alpha olefin. The epoxy may include a phenolic resin, which may be a novolac type (e.g., an epoxy phenol novolac, an epoxy cresol novolac, combinations thereof, or the like) or other type resin. Other preferred epoxy based materials includes a bisphenol-A epichlorohydrin ether polymer, or a bisphenol-A epoxy based material which may be modified with butadiene or another polymeric additive. Moreover, various mixtures of several different epoxy based materials may be employed as well. Examples of suitable epoxy based materials are sold under the trade name DER® (e.g., DER 331, DER 661, DER 662), commercially available from Olin Corporation.

When the polymer composition comprises an epoxy-based material as curable polymer, it preferably also comprises one or more curing agents and/or curing agent accelerators for the epoxy-based material. Amounts of curing agents and curing agent accelerators may vary within the polymer composition depending upon the type of cure required and crosslink density desired and the desired structural properties of the cured polymer composition. Preferably, the curing agent is a latent curing agent, i.e. is not reactive under ambient conditions but is heat activatable. Preferably, the curing agent contains functional groups that are capable of reacting with epoxy groups of an epoxy based material at an elevated activation of cure temperature. Preferably, the curing agent has an activation of cure temperature above about 110° C., more preferably in the range of from about 130° C. to about 220° C., preferably about 150° C. to about 220° C.

Exemplary ranges for the curing agents or curing agent accelerators for epoxy-based materials present range from about 0.001 wt.-% to about 7 wt.-%, relative to the total weight of the polymer composition. Preferably, the content of the curing agent for epoxy-based materials is at most about 25 wt.-%, more preferably at most about 15 wt.-%, still more preferably at most about 7 wt.-%, relative to the total weight of the polymer composition. Preferably, the content of the curing agent for epoxy-based materials is at least about 0.001 wt.-%, more preferably at least about 0.01 wt.-%, still more preferably at least about 0.1 wt.-%, relative to the total weight of the polymer composition.

Useful classes of curing agents for epoxy based materials are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), or mixtures thereof. The curing agents may include modified and unmodified polyamines or polyamides such as triethylenetetramine, diethylenetriamine tetraethylenepentamine, cyanoguanidine, dicyandiamides and the like. In a particularly preferred embodiment, the curing agent is or comprises dicyandiamide.

An accelerator for these curing agents (e.g., a modified or unmodified urea such as methylene diphenyl bis urea, an imidazole or a combination thereof) may also be provided.

The polymer composition may also include one or more additional polymer and/or copolymer materials, such as thermoplastics, elastomers, plastomers, combinations thereof or the like.

In a particularly preferred embodiment of the invention, particularly when the polymer composition is a structural adhesive or a structural foam, the polymer composition comprises or essentially consists of
 an organic acid component as defined above,
 an epoxy based material as defined above,
 a curing agent for the epoxy based material as defined above,
 optionally a filler as defined above,
 optionally, an impact modifier,
 optionally, a phenoxy resin, and
 optionally a flexibilizer.

In a preferred embodiment, besides the above epoxy based material, the polymer composition according to the invention comprises a phenoxy resin. The phenoxy resin typically has a substantially higher molecular weight than the epoxy based material and does not comprise reactive epoxy functional groups. Thus, the phenoxy resin according to the invention is distinct from the epoxy based material according to the invention.

Preferably, the content of the phenoxy resin is at least about 15 wt.-%, preferably from about 15 wt.-% to about 40 wt.-%. Preferably, the polymer composition contains at least about 5 wt.-% of an elastomer/epoxy adduct, preferably from about 5 wt.-% to about 40 wt.-% (the elastomer/epoxy adduct is then to be regarded as being separate from the epoxy based material, i.e. the epoxy based material does not encompass the elastomer/epoxy adduct). Additionally the preferred formulation contains at least 5 wt.-% of a core shell polymer, preferably from about 5 wt.-% to about 25 wt.-%. The percentages relate to the entire formulation including other ingredients that may be present.

Preferably, the phenoxy resin can be regarded as the condensation products of
 a bisphenol, preferably being selected from the group consisting of bisphenol A, bisphenol B, bisphenol E, bisphenol F, bisphenol G, bisphenol M, bisphenol P, bisphenol S, bisphenol Z, bisphenol AF, bisphenol AP, bisphenol BP, bisphenol FL, and bisphenol TMC; and
 epichlorohydrin;
or a blend of various resins of this type and/or their derivatives.

Preferred phenoxy resins include low molecular weight, medium molecular weight, or high molecular weight materials which typically have a melting point around about 150° C. or higher. As one important use of the polymer compositions is at temperatures experienced in the automobile e-coat process, it is preferred to formulate the formulation from which the polymer composition is made at temperatures below the melting point of the phenoxy resin. Accordingly, it is preferred that the phenoxy resin be provided to the formulating activity as a solution. It has been unexpectedly found that a liquid epoxy based material is a particularly good solvent for the phenoxy resin.

Preferred phenoxy resins are low molecular weight, medium molecular weight, or high molecular weight thermoplastic condensation products of bisphenol, preferably bisphenol A, and epichlorohydrin and their derivatives. Typically the phenoxy resins that may be employed are of the formula

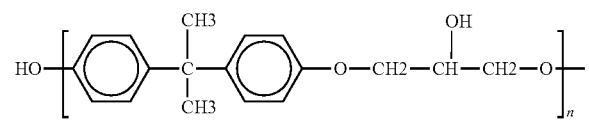

where n is typically
 from about 2 to about 12, preferably 2, 3, 4, 5, 6, 7, 8, 9, 10, 11 or 12; or
 from about 13 to about 29; or
 from about 30 to about 100, preferably from about 50 to about 90.

Modified phenoxy resins may also be used. Examples of phenoxy resins that may be used are the products marketed by Inchem Corp. Examples of suitable materials are the PKHB, PKHC, PKHH, PKHJ, PKHP. Alternatively phenoxy/polyester hybrids and epoxy/phenoxy hybrids may be used. In order to enhance the production of the structural polymer composition the phenoxy resin may be supplied to the other components as a solution. While any solvent may be used it is particularly preferred to use a liquid epoxy based material as the solvent as this can also contribute to the polymer composition properties upon activation.

Preferably, the polymer composition according to the invention comprises an impact modifier. The polymer composition may include at least one impact modifier. Various impact modifiers may be employed in the practice of the invention and often include one or more elastomers. The impact modifier may be at least about 4 wt.-%, at least about 7 wt.-%, at least about 10 wt.-%, at least about 13 wt.-% and even still more typically at least about 16 wt.-% of the polymer composition. The impact modifier may be less than about 90 wt.-%, less than about 40 wt.-% or even less than about 30 wt.-% of the polymer composition.

Preferably, the impact modifier is selected from elastomer/epoxy adducts, core/shell materials, and combinations thereof.

While it is contemplated that various polymer/elastomer adducts may be employed in the polymer composition used in the invention, one preferred adduct is an epoxy/elastomer adduct. The epoxy/elastomer hybrid or adduct may be included in an amount of from about 5 wt.-% to about 80 wt.-% of formulation, typically about 10 wt.-% to about 60 wt.-%, more preferably is about 10 wt.-% to about 30 wt.-% of the polymer composition (the elastomer/epoxy adduct is then to be regarded as being separate from the epoxy based material, i.e. the epoxy based material does not encompass the elastomer/epoxy adduct). The elastomer-containing adduct may be a combination of two or more particular adducts and the adducts may be solid adducts or liquid adducts at a temperature of about 23° C. or may also be combinations thereof. The adduct is preferably one or more adducts that are solid at a temperature of about 23° C.

The adduct itself generally includes about 1:8 to 3:1 parts of epoxy or other polymer to elastomer, and more preferably about 1:5 to 1:6 parts of epoxy to elastomer. More typically, the adduct includes at least about 5 wt.-%, more typically at least about 12 wt.-% and even more typically at least about 18 wt.-% elastomer and also typically includes not greater than about 50 wt.-%, even more typically no greater than about 40 wt.-% and still more typically no greater than about 35 wt.-% elastomer, although higher or lower percentages are possible. The elastomer compound may be a thermosetting elastomer. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. An example of a preferred epoxy/elastomer adduct is sold under the trade name HYPOX commercially available from CVC Chemical. Examples of additional or alternative epoxy/elastomer or other adducts suitable for use in the invention are disclosed in US 2004/0204551.

The elastomer-containing adduct, when added to the polymer composition material, may modify structural properties of the polymer composition such as strength, toughness, stiffness, flexural modulus, or the like.

The impact modifier may include at least one core/shell impact modifier. The impact modifier may compromise at least about 60 wt.-%, at least about 80 wt.-% or even at least about 95 wt.-% core/shell impact modifier.

As used herein, the term "core/shell impact modifier" denotes an impact modifier wherein a substantial portion (e.g., greater than about 30 wt.-%, about 50 wt.-%, about 70 wt.-% or more) thereof is comprised of a first polymeric material (i.e., the first or core material) that is substantially entirely encapsulated by a second polymeric material (i.e., the second or shell material).

The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. The first polymeric material, the second polymeric material or both of the core/shell impact modifier may include or may be substantially entirely composed of (e.g., at least about 70 wt.-%, about 80 wt.-%, about 90 wt.-% or more) one or more thermoplastics. Exemplary thermoplastics include, without limitation, styrenics, acrylonitriles, acrylates, acetates, polyamides, polyethylenes or the like.

Examples of useful core-shell graft copolymers are those where hard containing compounds, such as styrene, acrylonitrile or methyl methacrylate, are grafted onto a core made from polymers of soft or elastomeric containing compounds such as butadiene or butyl acrylate.

The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate. The shell portion may be polymerized from methyl methacrylate and optionally other alkyl methacrylates, such as ethyl, butyl, or mixtures thereof methacrylates. Additional core-shell graft copolymers useful in embodiments of the invention are described in U.S. Pat. Nos. 3,984,497; 4,096,202; 4,034,013; 3,944,631; 4,306,040; 4,495,324; 4,304,709; 4,536,436; and 7,892,396, the entireties of which are herein incorporated by reference herein. Examples of suitable core-shell graft copolymers include, but are not limited to, "MBS" (methacrylatebutadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The polymer composition according to the invention may include one or more additives (e.g., functional additives) for improving one or more various properties of the composition. As examples, additives may include antioxidants, antiozonants, ultraviolet absorbers, ultraviolet resistant agents, lubricants, antistatic agents, colorants, flame retardants, heat stabilizers, plasticizers, preservatives, processing aids, stabilizers, or combinations thereof, or the like.

The polymer composition of the invention may be used in various applications including but not limited to automotive industry, aircraft industry, building and construction industry.

The polymer composition of the invention may be used with any substrate and may be used as sealant or as adhesive for the bonding together of a range of substrates. For example the polymer composition may be used to bond together metal substrates such as in automobile manufacture. It may be used in the bonding of different substrates such as the bonding of metal to fiber reinforced composites. It may be used for the bonding of glass such as in windows and automobile windscreens.

Another aspect of the invention relates to a substrate provided with a coating of a polymer composition according to the invention. Preferably, the substrate according to the invention comprises metal and/or polymers. The substrate may also be an organo sheet material or a composite material.

Preferably, the substrate according to the invention comprises an automobile component. The thickness of the substrate is not particularly limited and may vary with the application of the polymer composition. Preferably, the substrate has a thickness of from about 500 μm to about 10000 μm.

In another embodiment the polymer composition may be of materials used for the production of seals and baffles in automobiles.

The invention may be used to create foams that assist in the reduction of vibration and noise after activation. In this regard, reinforced and vibrationally damped components can have increased stiffness which will reduce natural frequencies that resonate through the automotive chassis thereby reducing transmission, blocking or absorbing noise through the use of the conjunctive acoustic product. By increasing the stiffness and rigidity of the components of a vehicle, the amplitude and frequency of the overall noise, vibration or both that occurs from the operation of the vehicle and is transmitted through the vehicle can be reduced. These foams usually have a higher degree of expansion than foamed structural adhesives, typically at least about 1000 vol.-%, or at least about 1500 vol.-%, or at least about 2000 vol.-%, relative to the volume of the polymer composition before it was heated to the activation of expansion temperature.

Another aspect of the invention relates to the use of an organic acid component according to the invention as defined above as blowing agent for volume expansion of a polymer composition according to the invention as defined above.

Another aspect of the invention relates to the use of an organic acid component according to the invention as defined above, comprising at least one multifunctional organic acid, as a curing agent for a polymer composition according to the invention as defined above, preferably in the presence of reactive glycidyl functional groups in the curable polymer.

Another aspect of the invention relates to a method for volume expansion of a polymer composition according to the invention as defined above comprising the step of heating the polymer composition to the activation of expansion temperature.

Another aspect of the invention relates to a method for curing a polymer composition according to the invention as defined above comprising the step of heating the polymer composition to the activation of cure temperature.

Another aspect of the invention relates to a method comprising the steps of combining all ingredients of the polymer composition, shaping a part from the polymer composition, expanding and curing the polymer composition, preferably by applying heat.

Another aspect of the invention relates to a method comprising the steps of filling a cavity or sealing a cavity with the polymer composition according to the invention by expanding the polymer composition into said cavity, preferably by applying heat.

The present invention has several advantages and allows for improving conventional processes and articles, respectively, such as reducing welds, down-gaging metal, curing of specific polymers, and the like.

Another aspect of the invention relates to an article comprising a polymer composition according to the invention as defined above, which was heated to its activation of expansion temperature and activation of cure temperature, respectively, and subsequently cooled to room temperature.

EXAMPLES

The invention is further illustrated by the following examples which are not to be construed as limiting its scope.

Example 1—Volume Expansion

Volume expansion is measured using this method:
Cut in the material at least 3 samples with 25×25×3 mm dimensions
Determine uncured material volume V1 by obtaining its weight in air and water using a specific gravity balance. Record results
Bake uncured material as specified (30 minutes at 165° C.)
Determine material volume V2 by obtaining its weight in air and water using a specific gravity balance
Record results
Obtain % volume change using equation: $[(V_2-V_1)/V_1]\times 100$
Calculate the average of volume expansion of the three samples
A standard formulation comprising the following components is prepared:

| component | | weight | content |
|---|---|---|---|
| Lotryl ® 35BA40 | copolymer of ethylene and butyl acrylate (E/BA) | 66 g | 22.00 wt.-% |
| Lotader ® AX8900 | random terpolymer of ethylene, acrylic ester and glycidyl methacrylate (E/MA/GMA) | 18 g | 6.00 wt.-% |
| Evatane ® 28-05 | copolymer of ethylene and vinylacetate (E/VA) | 69 g | 23.00 wt.-% |
| Escorene ® MVO2514 | copolymer of ethylene and vinylacetate (E/VA) | 27 g | 9.00 wt.-% |
| Omya ® Calibrite | calcium carbonate | 14.4 g | 4.80 wt.-% |
| Escorez ® 5690 | aliphatic tackifying resin | 45 g | 15.00 wt.-% |
| Raven ® 410 | carbon black | 0.6 g | 0.20 wt.-% |

Thus, the standard formulation contains neither blowing agents nor blowing agent accelerators nor free radical polymerization initiators.

In an alternative embodiment, the random terpolymer of ethylene, acrylic ester and glycidyl methacrylate (E/MA/GMA) (e.g. Lotader® AX8900) can be replaced by a copolymer of ethylene and vinylacetate grafted with maleic anhydride (ENA/MAH) (e.g. Fusabond® MC190D) and a peroxide, optionally together with a coagent.

Aliquots of 240 g of the above standard formulation are mixed with various organic acids in various amounts. All components are blended and heated to a temperature of 80° C. at which no volume expansion occurs. The samples are allowed to cool to room temperature. The initial volume of each sample is determined.

All samples are heated to 165° C. thereby inducing volume expansion. The samples are kept at a temperature of 165° C. until no additional volume expansion can be observed. The expanded samples are allowed to cool to room temperature. The final volume of each sample is determined.

In the following table, the composition of the tested examples as well as the relative volume expansion upon heating (calculated in vol.-% as [final volume−initial volume]·100/initial volume) are summarized:

Comparative Examples (Single Carboxylic Acid)

| | C-1 | C-2 | C-3 | C-4 | C-5 | C-6 | C-7 | C-8 | C-9 |
|---|---|---|---|---|---|---|---|---|---|
| valeric acid | 5.00 wt.-% | | | | | | | | |
| pyruvic acid | | 5.00 wt.-% | | | | | | | |
| ascorbic acid | | | 15.00 wt.-% | | | | | | |
| maleic acid | | | | 15.00 wt.-% | | | | | |
| glutaric acid | | | | | 15.00 wt.-% | | | | |
| malonic acid | | | | | | 15.00 wt.-% | | | |
| malic acid | | | | | | | 15.00 wt.-% | | |
| oxalic acid | | | | | | | | 15.00 wt.-% | |
| citric acid | | | | | | | | | 15.00 wt.-% |
| Volume Expansion 30' @ 165° C. | 22 vol.-% ± 2 vol.-% | 61 vol.-% ± 3 vol.-% | 29 vol.-% ± 1 vol.-% | 79 vol.-% ± 5 vol.-% | 119 vol.-% ± 6 vol.-% | 125 vol.-% ± 17 vol.-% | 130 vol.-% ± 5 vol.-% | 247 vol.-% ± 51 vol.-% | 272 vol.-% ± 15 vol.-% |

Inventive Examples (Mixture of 2 or 3 Carboxylic Acids)

| | I-1 | I-2 | I-3 | I-4 | I-5 | I-6 |
|---|---|---|---|---|---|---|
| pyruvic acid | 5.00 wt.-% | | | | | 2.00 wt.-% |
| ascorbic acid | | | | | 2.00 wt.-% | |
| maleic acid | | | 15.00 wt.-% | | | |
| malonic acid | | 5.00 wt.-% | | | | |
| malic acid | | | | 2.00 wt.-% | | |
| citric acid | | | | 15.00 wt.-% | 15.00 wt.-% | 15.00 wt.-% |
| oxalic acid | 15.00 wt.-% | 15.00 wt.-% | 5.00 wt.-% | 3.00 wt.-% | 3.00 wt.-% | 3.00 wt.-% |
| Volume Expansion (%) 30' @ 165° C. | 596 vol.-% ± 17 vol.-% | 645 vol.-% ± 33 vol.-% | 712 vol.-% ± 41 vol.-% | 505 vol.-% ± 15 vol.-% | 526 vol.-% ± 21 vol.-% | 556 vol.-% ± 3 vol.-% |

It becomes clear from the above experimental data that the combinations of organic acids according to the invention (I-1 to I-6), under otherwise identical experimental conditions, provide higher volume expansions than one would expect based upon the comparative data for the individual single organic acids.

For example, the inventive combination I-1 of 5 wt.-% pyruvic acid and 15 wt.-% oxalic acid provides a volume expansion of 596 vol.-%, whereas that sum of the volume expansion of comparative example C-2 (5 wt.-% pyruvic acid alone, 61 vol.-%) and comparative example C-8 (15 wt.-% oxalic acid alone, 247 vol.-%) would indicate an expected volume expansion of only 308 vol.-% (61 vol.-%+247 vol.-%).

Likewise, the inventive combination I-2 of 5 wt.-% malonic acid and 15 wt.-% oxalic acid provides a volume expansion of 645 vol.-%, whereas that sum of the volume expansion of comparative example C-6 (15 wt.-% malonic acid alone, 125 vol.-%) and comparative example C-8 (15 wt.-% oxalic acid alone, 247 vol.-%) would indicate an expected volume expansion of less than 372 vol.-% (125 vol.-%+247 vol.-%), taking into account that the formulation of comparative example C-6 contains thrice the amount of malonic acid (15 wt.-%) contained in the formulation of inventive example I-2 (5 wt.-%).

Example 2—Curing

The measurements are done using a planer plane rheometer. The measuring system has a diameter of 25 mm with a gap of 0.88 mm. A Normal force of 0.1 N and a strain of 1% amplitude with a frequency of 1 Hz are applied. The temperature varies between 70° C. and 165° C. with a rate of 20° C./min.

Figure 2:
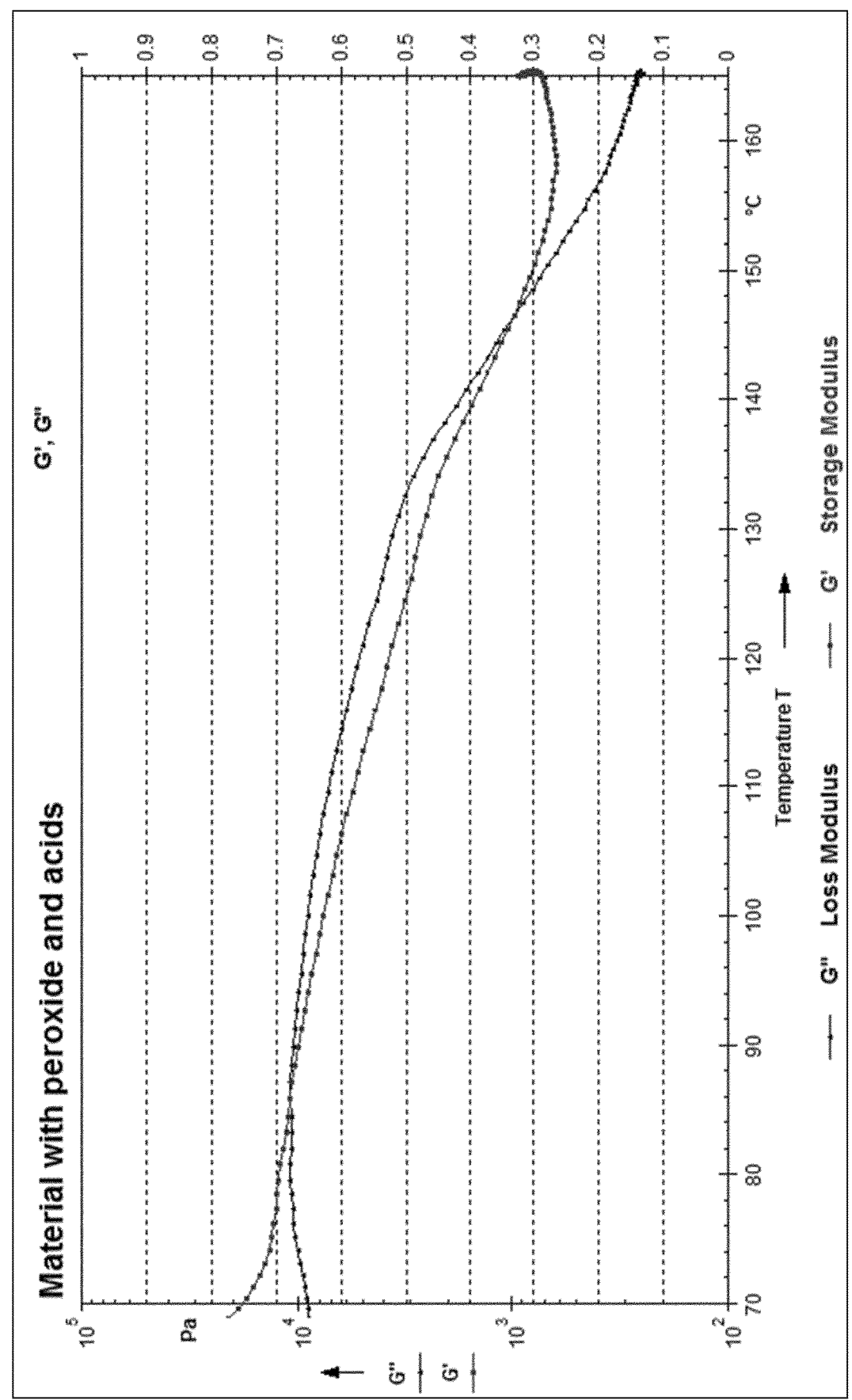
FIG. 2 is a graph showing storage modulus and loss modulus in relation to temperature for materials of the present teachings with peroxide.

FIGS. 1 and 2 show the evolution of the storage modulus G' and loss modulus G" with the temperature. G' and G" curves have in both FIG. 2 intersections: The first intersection is at about 90° C. where the material is transformed from the solid state to the molten state (G" is higher than G').

The second intersection is at about 150° C. that is related to the gel point. At this point, the material has crosslinked and has the behavior of a solid.

The invention claimed is:

1. A curable volume expandable polymer composition comprising:
an organic acid component, wherein the organic acid component comprises a first organic acid, a second organic acid, and including one or more additional organic acids having a molecular weight of at most 300 g/mol;

wherein said polymer composition, when being heated to an activation of expansion temperature of from about 150° C. to about 220° C., undergoes volume expansion due to decarboxylation of the first organic acid and/or the second organic acid and wherein the relative weight ratio of the first organic acid to the second organic acid is within the range of from 10:1 to 1:10; and wherein said polymer composition is adapted to form adhesive characteristics upon exposure to said activation of expansion temperature to form a bonding agent between two surfaces; and wherein the first organic acid and/or the second organic acid and/or the one or more additional organic acids is a saturated or unsaturated aliphatic monocarboxylic acid, which may optionally comprise at least one carbonyl group and/or which may optionally comprise at least one hydroxyl group;

wherein the first organic acid and/or the second organic acid and/or the one or more additional organic acids is glyoxylic acid or pyruvic acid.

2. The polymer composition according to claim 1, wherein the first organic acid and/or the second organic acid independently of one another have a molecular weight of at most 500 g/mol.

3. The polymer composition according to claim 1, wherein the content of the organic acid component is at least 0.1 wt.-%, relative to the total weight of the polymer composition.

4. The polymer composition according to claim 1, wherein the content of the organic acid component is at least 5.0 wt.-%, relative to the total weight of the polymer composition.

5. The polymer composition according to claim 1, wherein the content of the organic acid component is within the range of from 5.0 to 30 wt.-%, relative to the total weight of the polymer composition.

6. The polymer composition according to claim 2, wherein the content of the organic acid component is within the range of 10±7.5 wt.-%, or 10±5.0 wt.-%, or 10±2.5 wt.-% or 12.5±10 wt.-%, or 12.5±7.5 wt.-%, or 12.5±5.0 wt.-%, or 12.5±2.5 wt.-%, or 15±12.5 wt.-%, or 15±10 wt.-%, or 15±7.5 wt.-%, or 15±5.0 wt.-%, or 15±2.5 wt.-%, or 17.5±12.5 wt.-%, or 17.5±10 wt.-%, or 17.5±7.5 wt.-%, or 17.5±5.0 wt-%, or 17.5±2.5 wt.-%, or 20±10 wt.-%, or 20±7.5 wt.-%, or 20±5.0 wt.-%, or 20±2.5 wt.-%, or 22.5±7.5 wt.-%, or 22.5±5.0 wt.-%, or 22.5±2.5 wt.-%, or 25±5.0 wt.-%, or 25±2.5 wt.-%, or 27.5±2.5 wt.-%, relative to the total weight of the polymer composition.

7. The polymer composition according to claim 1, wherein the first organic acid and/or the second organic acid and/or optionally one or more additional organic acids independently of one another are hydrocarbons comprising no functional groups other than carboxylic acid groups (—CO2H), carbonyl groups (—C(=O)—), hydroxyl groups (—OH) and vinylogous carboxylic acid groups (—C(=O)—C=C—OH).

8. The polymer composition according to claim 1, wherein the first organic acid is selected from
(i) monocarboxylic acids, dicarboxylic acids, tricarboxylic acids, tetracarboxylic acids, hydroxycarboxylic acids, aminocarboxylic acids and ketocarboxylic acids; and/or
(ii) saturated or unsaturated aliphatic carboxylic acids; and/or
(iii) aliphatic carboxylic acids, cycloaliphatic carboxylic acids, heterocycloaliphatic carboxylic acids, aromatic carboxylic acids or heteroaromatic carboxylic acids.

9. The polymer composition according to claim 1, wherein the second organic acid is selected from (i) monocarboxylic acids, dicarboxylic acids, tricarboxylic acids, tetracarboxylic acids, hydroxycarboxylic acids, aminocarboxylic acids and ketocarboxylic acids; and/or
(ii) saturated or unsaturated aliphatic carboxylic acids; and/or
(iii) aliphatic carboxylic acids, cycloaliphatic carboxylic acids, heterocycloaliphatic carboxylic acids, aromatic carboxylic acids or heteroaromatic carboxylic acids.

10. The polymer composition according to claim 1, wherein the one or more additional organic acids independently of one another are selected from
(i) monocarboxylic acids, dicarboxylic acids, tricarboxylic acids, tetracarboxylic acids, hydroxycarboxylic acids, and ketocarboxylic acids; and/or
(ii) saturated or unsaturated aliphatic carboxylic acids; and/or
(iii) aliphatic carboxylic acids, cycloaliphatic carboxylic acids, heterocycloaliphatic carboxylic acids, aromatic carboxylic acids or heteroaromatic carboxylic acids.

11. The polymer composition according to claim 1, wherein the first organic acid and/or the second organic acid and/or the one or more additional organic acids is a beta-keto acid.

12. The polymer composition according to claim 11, wherein the beta-keto acid is acetoacetic acid.

13. The polymer composition according to claim 1, wherein the saturated or unsaturated aliphatic monocarboxylic acid is selected from the group consisting of formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, acrylic acid, methacrylic acid, lactic acid, glycolic acid, pyruvic acid, and acetoacetic acid.

14. The polymer composition according to claim 1, which comprises
(i) the organic acid component;
(ii) an olefin acrylate copolymer, selected from (E/MA), (E/EA), (E/PA (E/BA), (E/MMA), (E/EMA), (E/PMA), (E/BMA), and mixtures thereof;
(iii) optionally, an olefin acrylate terpolymer, selected from (E/MA/GA), (E/EA/GA), (E/PA/GA), (E/BA/GA), (E/MMA/GA), (E/EMA/GA), (E/PMA/GA), (E/BMA/GA), (E/MA/GMA), (E/EA/GMA), (E/PA/GMA), (E/BA/GMA), (E/MMA/GMA), (E/EMA/GMA), (E/PMA/GMA), (E/BMA/GMA), and mixtures thereof;
(iv) an olefin vinylacetate copolymer, selected from (E/VA), (E/VA/MAH), and mixtures thereof;
(v) optionally, a tackifyer, an aliphatic tackifying resin; and
(vi) optionally, one or more fillers.

15. The polymer composition according to claim 1, wherein the composition:
(i) is dry to the touch at room temperature;
(ii) becomes adhesive at elevated temperature;
(iii) is heat curable; and
(iv) is cured when being heated to an activation of cure temperature.

16. A curable volume expandable polymer composition comprising:
- an organic acid component, wherein the organic acid component comprises a first organic acid, a second organic acid, and including one or more additional organic acids having a molecular weight of at most 300 g/mol;
- wherein said polymer composition, when being heated to an activation of expansion temperature of from about 150° C. to about 220° C., undergoes volume expansion due to decarboxylation of the first organic acid and/or the second organic acid and wherein the relative weight ratio of the first organic acid to the second organic acid is within the range of from 10:1 to 1:10; and
- wherein said polymer composition is adapted to form adhesive characteristics upon exposure to said activation of expansion temperature to form a bonding agent between two surfaces; and
- wherein the first organic acid and/or the second organic acid and/or the one or more additional organic acids is a saturated or unsaturated aliphatic monocarboxylic acid, which may optionally comprise at least one carbonyl group and/or which may optionally comprise at least one hydroxyl group;
- wherein the first organic acid and/or the second organic acid and/or the one or more additional organic acids is an alpha-keto acid.

17. A curable volume expandable polymer composition comprising:
- an organic acid component, wherein the organic acid component comprises a first organic acid, a second organic acid, and including one or more additional organic acids having a molecular weight of at most 300 g/mol;
- wherein said polymer composition, when being heated to an activation of expansion temperature of from about 150° C. to about 220° C., undergoes volume expansion due to decarboxylation of the first organic acid and/or the second organic acid and wherein the relative weight ratio of the first organic acid to the second organic acid is within the range of from 10:1 to 1:10; and
- wherein said polymer composition is adapted to form adhesive characteristics upon exposure to said activation of expansion temperature to form a bonding agent between two surfaces; and
- wherein the first organic acid and/or the second organic acid and/or the one or more additional organic acids is a saturated or unsaturated aliphatic monocarboxylic acid, which may optionally comprise at least one carbonyl group and/or which may optionally comprise at least one hydroxyl group;
- wherein the first organic acid and/or the second organic acid and/or the one or more additional organic acids is glyoxylic acid or pyruvic acid.

18. The polymer composition according to claim 16, including an olefin acrylate copolymer, selected from (E/MA), (E/EA), (E/PA), (E/BA), (E/MMA), (E/EMA), (E/PMA), (E/BMA), and mixtures thereof.

19. The polymer composition according to claim 16, including an olefin acrylate terpolymer, selected from (E/MA/GA), (E/EA/GA), (E/PA/GA), (E/BA/GA), (E/MMA/GA), (E/EMA/GA), (E/PMA/GA), (E/BMA/GA), (E/MA/GMA), (E/EA/GMA), (E/PA/GMA), (E/BA/GMA), (E/MMA/GMA), (E/EMA/GMA), (E/PMA/GMA), (E/BMA/GMA), and mixtures thereof.

20. The polymer composition according to claim 16, including an aliphatic tackifying resin and a filler.

* * * * *